US010009105B2

(12) United States Patent
Brueckheimer et al.

(10) Patent No.: US 10,009,105 B2
(45) Date of Patent: Jun. 26, 2018

(54) OPTICAL NETWORK VISUALIZATION AND PLANNING

(71) Applicant: Ciena Corporation, Hanover, MD (US)

(72) Inventors: Simon Brueckheimer, London (GB); Dave Stacey, Newbury (GB); Benoît Châtelain, Rosemere (CA)

(73) Assignee: Ciena Corporation, Hanover, MD (US)

( * ) Notice: Subject to any disclaimer, the term of this patent is extended or adjusted under 35 U.S.C. 154(b) by 0 days. days.

(21) Appl. No.: 15/370,101

(22) Filed: Dec. 6, 2016

(65) Prior Publication Data

US 2017/0353243 A1     Dec. 7, 2017

Related U.S. Application Data

(60) Provisional application No. 62/346,680, filed on Jun. 7, 2016.

(51) Int. Cl.
| | |
|---|---|
| *H04B 17/00* | (2015.01) |
| *H04B 10/27* | (2013.01) |
| *H04B 10/079* | (2013.01) |
| *H04J 14/02* | (2006.01) |

(52) U.S. Cl.
CPC ......... *H04B 10/27* (2013.01); *H04B 10/0793* (2013.01); *H04J 14/0227* (2013.01)

(58) Field of Classification Search
CPC .. H04B 10/27; H04B 10/0793; H04J 14/0227
USPC .............................................. 398/9
See application file for complete search history.

(56) References Cited

U.S. PATENT DOCUMENTS

| | | | | | |
|---|---|---|---|---|---|
| 5,974,237 | A | * | 10/1999 | Shurmer | H04L 41/142 709/223 |
| 6,850,253 | B1 | * | 2/2005 | Bazerman | H04L 43/0811 715/734 |
| 7,096,176 | B1 | * | 8/2006 | Hess | H04B 10/07 703/13 |
| 7,149,975 | B1 | | 12/2006 | Johnson et al. | |

(Continued)

OTHER PUBLICATIONS

Telecommunication Standardization Sector of ITU, ITU-T G.694.1, Spectral grids for WDM applications: DWDM frequency grid, Feb. 2012, pp. 1-16.

*Primary Examiner* — Juan A Torres
(74) *Attorney, Agent, or Firm* — Clements Bernard Walker PLLC; Christopher L. Bernard; Lawrence A. Baratta, Jr.

(57) ABSTRACT

Computer-implemented systems and methods for visually presenting spectrum usage of optical spectrum in an optical network include displaying a network map of the optical network comprising a plurality of nodes and a plurality of links connecting the plurality of nodes to one another; responsive to obtaining spectrum data comprising channel assignments on the plurality of links and nodes as endpoints of the associated channel assignments, displaying a plurality of circular histograms to visually illustrate spectrum usage in the optical network; and adjusting the plurality of circular histograms based on selections of a plurality of endpoints in the optical network. The plurality of circular histograms visually represent the spectrum usage by representing the optical spectrum in the optical network around the associated circular histogram, and wherein each portion or segment of the plurality of circular histograms represents one of a wavelength and a portion of spectrum.

20 Claims, 19 Drawing Sheets

(56) References Cited

U.S. PATENT DOCUMENTS

| | | | |
|---|---|---|---|
| 7,207,012 B1* | 4/2007 | House | G06F 3/0481 455/457 |
| 7,623,785 B2* | 11/2009 | Krishnaswamy | H04J 14/0227 370/238 |
| 7,769,290 B2* | 8/2010 | Smith | H04J 14/02 370/352 |
| 7,917,854 B1 | 3/2011 | Beaudoin et al. | |
| 8,873,956 B2* | 10/2014 | Leung | H04J 14/0227 398/173 |
| 2002/0024535 A1* | 2/2002 | Ueno | H04L 41/0681 715/736 |
| 2003/0130821 A1* | 7/2003 | Anslow | H04L 41/12 702/186 |
| 2003/0180042 A1 | 9/2003 | Nelles et al. | |
| 2004/0008622 A1 | 1/2004 | Dolbec et al. | |
| 2004/0107277 A1* | 6/2004 | Levesque | H04L 41/082 709/223 |
| 2004/0186701 A1* | 9/2004 | Aubin | H04L 41/0896 703/13 |
| 2005/0036788 A1* | 2/2005 | Matsuoka | H04B 10/2939 398/81 |
| 2006/0020694 A1* | 1/2006 | Nag | H04L 29/06027 709/223 |
| 2007/0208840 A1 | 9/2007 | McConville et al. | |
| 2007/0253712 A1* | 11/2007 | Katagiri | H04B 10/275 398/59 |
| 2008/0181609 A1* | 7/2008 | Yi | H04L 41/145 398/58 |
| 2010/0040366 A1* | 2/2010 | Jenkins | H04J 14/0227 398/34 |
| 2010/0042989 A1* | 2/2010 | Anand | H04L 41/145 717/176 |
| 2013/0236169 A1* | 9/2013 | Gaudette | H04B 10/0793 398/25 |
| 2017/0116297 A1* | 4/2017 | Wittenburg | G06F 17/2241 |
| 2017/0288905 A1* | 10/2017 | Wang | H04L 12/4641 |

\* cited by examiner

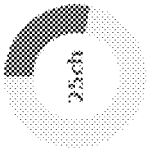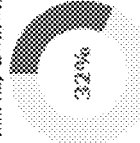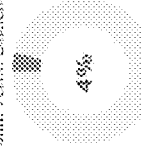

Network Used Spectrum: the count of distinct channels (wavelengths) used at least once among all the links of the network (or a sub-region)

Link Used Spectrum: the count of distinct channels (wavelengths) used at least once among all the links of the possible paths A – Z (also Path Used Spectrum)

Link Connection Hop Efficiency: the ratio between the total hops used by the selected connections, and the total hops of their shortest possible paths

Link Connection Termination Efficiency: the proportion of termination of the selected connection terminations that are at a selected link termination

FIG. 9

OPTICAL NETWORK VISUALIZATION AND PLANNING

CROSS-REFERENCE TO RELATED APPLICATION(S)

The present patent/application claims priority to U.S. Provisional Patent Application No. 62/346,680, filed on Jun. 7, 2016, and entitled "VISUALIZATION AND OPTIMIZATION OF WAVELENGTH USAGE AND ASSIGNMENT," the contents of which are incorporated by reference.

FIELD OF THE DISCLOSURE

The present disclosure generally relates to optical networking systems and methods. More particularly, the present disclosure relates to visualization and optimization of wavelength usage and routing assignment in optical networks.

BACKGROUND OF THE DISCLOSURE

In fixed grid optical networks, wavelengths are spaced apart from each other according to a wavelength spectrum grid such as defined by the International Telecommunication Union (ITU) in ITU-T G.694.1 (02/12), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (02/12), each signal can be allocated to spectrum with different widths optimized for the bandwidth requirements of the particular bit rate and modulation scheme of the individual channels. Note, flexible grid networks may still utilize a grid, albeit at a much finer granularity than grid networks (e.g., 6.25 GHz vs. 50 GHz). On the other hand, gridless networks have no such grid constraints. In both fixed grid and flexible grid optical systems, wavelengths or spectrum is assigned on various network links between nodes to support channel connectivity. Currently, network operators rely on manual wavelength assignment techniques using highly partitioned data sets. As complexity has grown, this has become increasingly impractical; there is an emerging urgency for advisory and/or automated techniques with newer flexible and adaptive bit rate signaling to assign wavelengths or spectrum in a highly optimized manner.

Current approaches to wavelength usage, assignment, and visualization use multiple spreadsheets and or spreadsheet tabs to represent a vast amount of information—network nodes, links, connectivity, and spectrum/channel usage. For example, in FIG. 1, a spreadsheet can use columns to represent connections between nodes and rows to represent wavelengths with each filled in the cell representing a used wavelength at a node or between nodes. Of course, such as an approach while not ideal, works adequately for simple linear network routes which may be wholly contained in a single sheet, but as network complexity and meshing grows, the spreadsheet approach becomes cumbersome, such as relying on multiple tabs or sheets to represent the vast amount of information and level of abstraction. This technique would also be wholly inadequate for flexible grid and adaptive bit rate signaling technologies.

BRIEF SUMMARY OF THE DISCLOSURE

In various exemplary embodiments, the present disclosure relates to visualization and planning and optimization of wavelength usage and routing assignment in optical networks. Specifically, a computer-implemented method, a server, and software stored in a non-transitory computer-readable medium are described for implementing a visualization and planning tool which provides network operators succinct visual indications and understanding related to the spectrum usage and resource efficiencies in an optical network (and potentially higher layers), of any size or topology. The visualization and planning tool provides a great deal of information in an extremely compact and easy to understand form, the key feature being concentric circular bar graphs to represent the spectrum in the overall network, on any paths between two points A-Z and on a specific path, and the interactivity between this feature and the other elements of the display.

In an exemplary embodiment, a computer-implemented method for visually presenting spectrum usage in an optical network includes displaying a network map of the optical network comprising a plurality of nodes and a plurality of links connecting the plurality of nodes to one another; responsive to obtaining spectrum data comprising channel assignments on the plurality of links and nodes as endpoints of the associated channel assignments, displaying a plurality of circular histograms to visually illustrate spectrum usage in the optical network; and adjusting the plurality of circular histograms based on selections of a plurality of endpoints in the optical network.

In another exemplary embodiment, a server configured to visually present spectrum usage in an optical network includes a network interface and a processor connected to one another, and memory storing instructions that, when executed, cause the processor to cause a display of a network map of the optical network comprising a plurality of nodes and a plurality of links connecting the plurality of nodes to one another; responsive to obtaining spectrum data comprising channel assignments on the plurality of links and nodes as endpoints of the associated channel assignments, cause a display of a plurality of circular histograms to visually illustrate spectrum usage in the optical network; and adjust the plurality of circular histograms based on selections of a plurality of endpoints in the optical network.

In a further exemplary embodiment, a non-transitory computer readable medium comprising instructions executable by a processor to visually present spectrum usage of optical spectrum in an optical network, and in response to such execution causes the processor to perform operations including displaying a network map of the optical network comprising a plurality of nodes and a plurality of links connecting the plurality of nodes to one another; responsive to obtaining spectrum data comprising channel assignments on the plurality of links and nodes as endpoints of the associated channel assignments, displaying a plurality of circular histograms to visually illustrate spectrum usage in the optical network; and adjusting the plurality of circular histograms based on selections of a plurality of endpoints in the optical network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 9 is a screen shot of an exploded view of the GUI of the visualization tool illustrating network utilization metrics;

DETAILED DESCRIPTION OF THE DISCLOSURE

Figure 1:
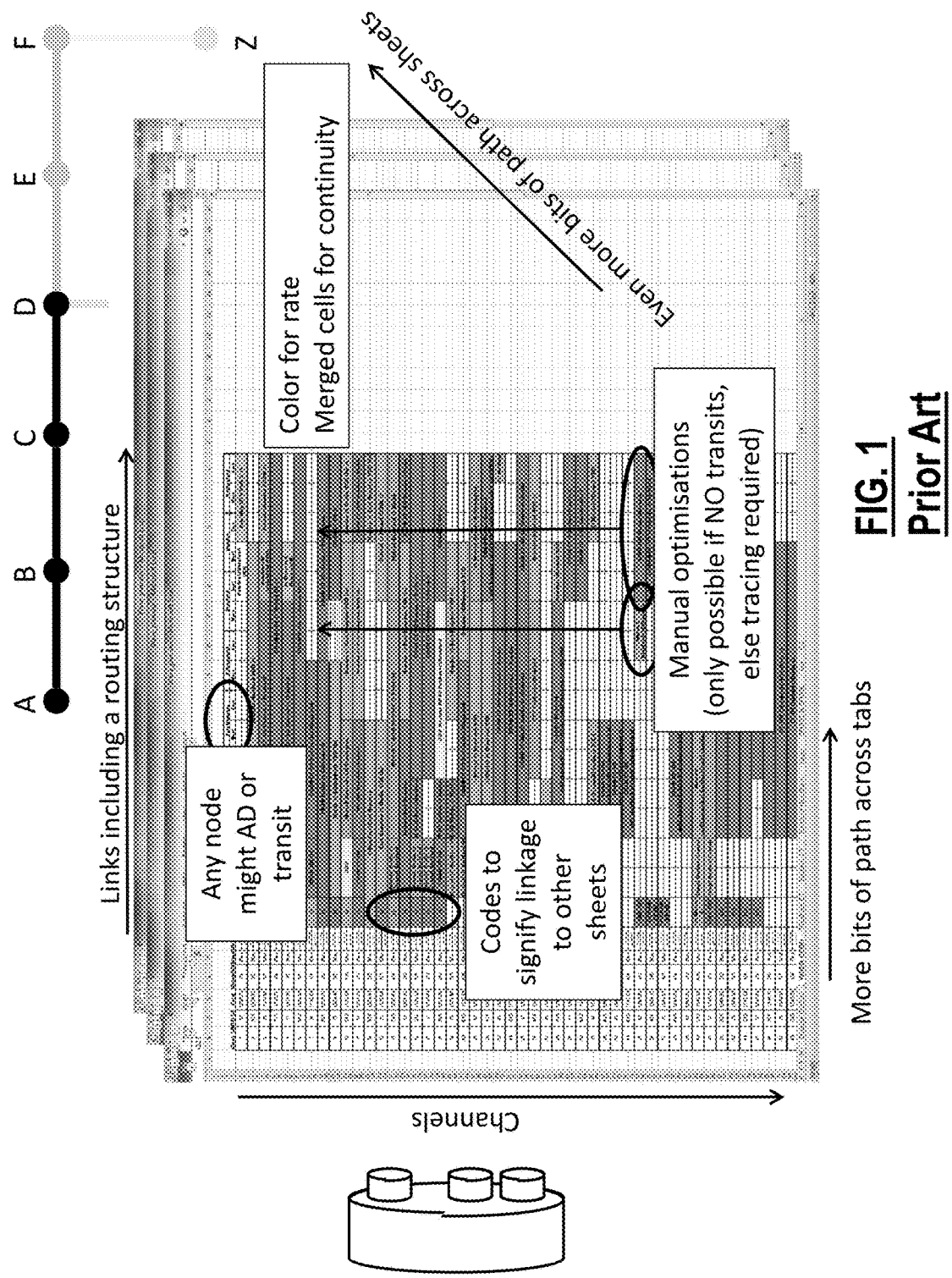
FIG. 1 is a screen shot of spreadsheets in the prior art for tracking wavelength usage.

Again, in various exemplary embodiments, the present disclosure relates to visualization, planning and optimization of wavelength usage and assignment in optical networks. Specifically, a method, a server, and software stored in a non-transitory computer-readable medium are described for implementing a visualization tool which provides network operators succinct visual indications and understanding related to the spectrum usage and resource efficiencies in an optical network (and potentially higher layers), of any size or topology, via an all-in-one Graphical User Interface (GUI). The key is the visualization tool provides a great deal of information in an extremely compact and easy to understand form, at all scales from node and link to the entire network, using concentric circular bar graphs to represent the spectrum in the overall network, on any paths between two points A-Z and on a specific path.

The visualization tool can be cloud-hosted, accessible via any type of computing device (i.e., desktop, laptop, mobile device, etc.). Also, the visualization tool can be a locally executed application on any type of computing device. The visualization tool provides all-in-one insight of Dense Wavelength Division Multiplexing (DWDM) spectrum usage including for example node, link, path, region, and overall network. The visualization tool includes various easy to understand visualizations including utilization "heat maps", circular bar graphs of spectrum use frequencies, physical and logical topology in list and map form, optical reach distance by wavelength bit rate, etc. In addition to visualization, the visualization tool includes metrics which may assist operators in a variety of tasks such as resources optimization, capacity planning, service routing and planning and wavelength selection. The metrics can assist in macro efficiency assessment, i.e., is the network configured efficiently. The metrics include blocking probability in the network, by links and by paths, which indicate how easy it may be to add new wavelengths, as well as used spectrum efficiency, connection hop efficiency and connection termination efficiency (are connections being routed A-Z efficiently) to optimize current demands.

Advantageously, the visualization tool provides 1) compact and efficient visualization of vast amount of complex data related to spectrum usage over all or an arbitrary subset of links of an optical network; 2) metrics presented to assist in manual selection and planning of wavelengths and also to drive automatic holistic or selective spectrum use and or routing optimization; 3) support for fixed single or mixed grid channels and flexible grid (gridless) and adaptive bit rate wavelengths in the visualization; 4) can also work with advisory and or automated wavelength assignment techniques to provide confirmatory visualization of processes; and 5) support for graphically displaying subrate usage where muxponders are used.

The visualization tool enables an ability to visualize, operate and optimize all aspects of a complete optical network from a single display GUI, providing executive (high-level) and detailed views of the network to serve the roles of capacity planning, resource optimization, wavelength provisioning operations, engineering, and deployment, among others; using live network data as the record and network configuration baseline; overlaying planning information; and removing the need for any holistic standalone file and database strategy (no more manual spreadsheets). With the visualization tool, it is possible to determine the availability of spectrum readily on any path or set of paths to assess spectral capacity, and hotspots at various scales and geographical partitions; assess network efficiency through simple to understand metrics at various scales and geographical partitions; and determine optimal placement for new traffic demands. Furthermore, the visualization tool can support various plug-ins or add-ons such as network optimization to enable exploration of current network efficiency against the ideal and also in an advisory capacity to suggest optimal placement as well as stepwise efficiency improvement; path computation and optical reach verification to determine maximum wavelength bit rates and distances and advise or automate the placement of wavelength regeneration.

Terminology

The visualization tool provides visualizations of optical networks. In the descriptions herein, reference is made here to nodes, links, paths, connections, and channels with respect to an optical network. A node is an endpoint, switch point, or pass through point of a wavelength, such as a Reconfiguration Optical Add/Drop Multiplexer (ROADM) network element. The node is usually a single managed entity in a management system and the visualization tool, and physically the node can represent one or more shelves, cards, etc. Wavelengths can only be added or dropped at the nodes, and each physical site with nodes can include one or more nodes. A link is a route between two nodes, e.g., a ROADM to ROADM adjacency. The link may include one or more serial optical sections which are in turn composed of one or more fiber spans and intermediate optical equipment such as amplifiers. A path is a contiguous concatenation of one or more links between a pair of nodes. A connection is a wavelength or demand routed over a path to a line side at least, for example for regeneration, and a client side termination at each ultimate end of the connection. A client side may be a single port at equal rate to the wavelength, or multiplex of ports at lower rates than the wavelength. A channel is a defined part of the optical spectrum in a fixed grid or a contiguous portion of optical spectrum is a flexible grid. Adaptive bit rates may exploit fixed or flexible grids.

Visualization Tool GUI

Figure 2A:
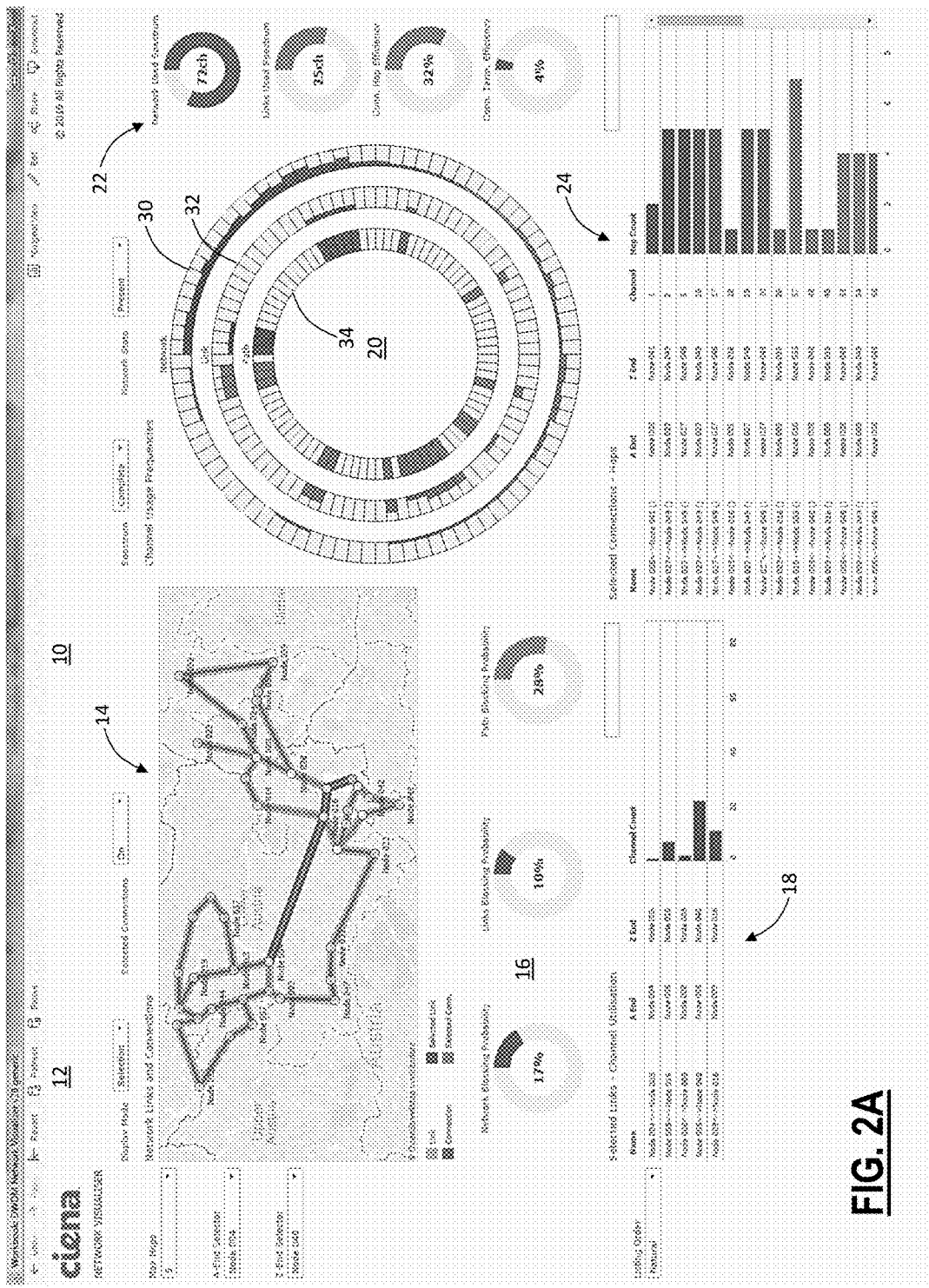
FIGS. 2A-2B are screen shots of a Graphical User Interface (GUI) of a visualization tool.
Figure 2B:
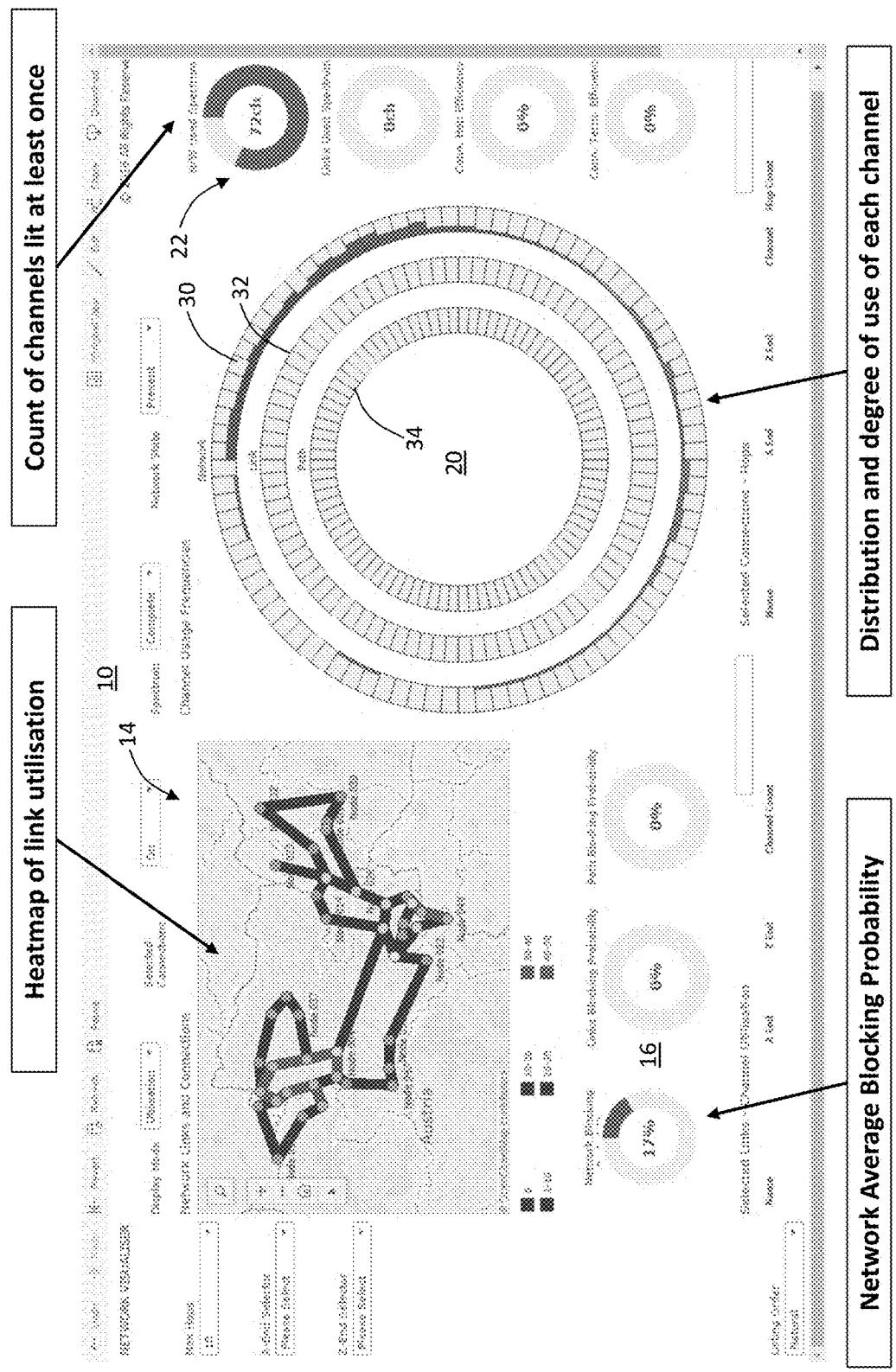

Referring to FIGS. 2A-2B, in an exemplary embodiment, screen shots illustrate a GUI of a visualization tool 10. The visualization tool 10 includes controls 12, a network map 14, blocking probabilities 16, links and paths 18, a circular histogram 20 of the spectrum, network utilization metrics 22, and connections 24. The network of nodes and link adjacencies is shown in the network map, and the spectrum utilization frequency on the circular histogram 20. The circular histogram includes preferentially three concentric circles 30, 32, 34 with bar graphs in each segment (spoke) to depict channel spectrum utilization. Each circle 30, 32, 34 represents the entire available optical spectrum, e.g., C-band—about 1530-1565 nm. Each circle 30, 32, 34 may be segmented to represent a subdivision of the optical spectrum, for example a wavelength (for fixed grid) or a fixed or variable portion of the spectrum (for flexible grid). The circles may also be continuous (non-segmented) or of a very fine subdivision. The first outer circle 30 is the overall network as shown, but may also be any geographic regional partition of the network. The fill of each segment (circular bar graph, or radial height of colouration) represents how often (frequently) the wavelength or portion of the spectrum is used across the network. A fully filled segment in this circle 30 would mean the wavelength or portion of the spectrum is used on every link in the network, and an empty segment means the wavelength is not used anywhere. This first circle 30 provides an efficient visualization of overall spectrum usage, and each segment is normalized by the ratio of the number of links with that portion of spectrum in use versus the number of links that have the potential to carry that portion of the spectrum. For example in mixed 44 and 88 channel fixed grid networks, the denominator of each alternate could vary according to the populations of 44 and 88 capable links.

The second circle 32 is a link circle which represents the spectrum or wavelength usage of the uniquely distinct links between any two selected arbitrary points in the network, A-Z, where the links belong to a set of allowable paths between the two points A-Z. That is, the link circle 32 is a sub-region of the network circle 30. The link circle can be based on user selections in the network map 14, e.g., clicking on two A-Z points. The link circle 32 may include a certain or any number of allowable paths between A-Z. Similar to the network circle 30, the link circle 32 provides a bar graph of how many times the wavelength or portion of the spectrum is used in the sub-region. Note, allowable paths can be based on configurable parameters such as hop count, distance, optical reach by interface or bit rate, delay or any other cost or reachability constraint. If hop count is set to infinity, the link circle 32 can include all possible paths between A-Z, or if the hop count is set to a minimum value, the link circle 32 can be just one path. Filters other than hops may be equally applied to allowable paths, for example optical reach distance or maximum/minimum wavelength bit rate. Obviously, any links in between A-Z may be selected, but also any arbitrary set of links could be manually selected—not necessary constrained by path criteria.

The inner circle 34 is a path circle, representing the set of uniquely distinct allowable paths between A-Z showing available and used spectrum between A-Z, corresponding to all those paths that may be constructed from the set of links above. Again, this is an efficient visualization of all allowable paths, where the circle 34's segments indicate the number of times a wavelength is used against the number of paths between the A-Z selection. This is effectively a measure of path blocking, or path occupancy rather than link occupancy, i.e. a path is said to be blocked for a specific channel if that channel is used on at least one of the links making up that path; conversely a path is open for a specific channel if that channel is not occupied on any single link that path comprises. The fill of these segments is therefore the ratio of the number of paths which are blocked by the channel, versus the total number of unique allowable paths between A and Z.

It is possible to have more or fewer circles 30, 32, 34, and in general, any circle could serve one or a multiple of purposes. A circle, in general, may have an arbitrary number of segments as a circular bar chart, or be a continuum as per a line chart. At the resolution of a segment or the highest resolution implemented, the radial height representing the ratio of the number of instances with a particular property, e.g. use of spectrum, versus the total number of instances in any particular defined region. As a visual ratio of these two measures, it is possible for the scale of the defined region to be arbitrarily complex. Further examples of such ratios may be capacity in bits per second for non-homogenous channel rates, or even the utilization of multiplexed channels, so called sub-rate services, among any mixed population of wavelength types.

Again, the visualization tool is a Graphical User Interface (GUI), supporting point and click operation with selections of A-Z endpoints, nodes, links or connections made on the network map 14 or by programming A and Z, or by selecting any set of specific links or paths 18, thereby changing the display of spectrum of the circles 30, 32, 34 according to that selection. For any given spectrum utilization, circles 30, 32, 34 may be similarly interacted with by point and click operations to reveal the links, paths, wavelength connections etc. that contribute to the spectrum utilization. Or one or more links may be selected to highlight the individual contribution to the spectrum utilization. In this manner deeper understanding of the network constructs and assignments can be revealed, to the extent that far exceeds the capabilities of present techniques, particularly spreadsheets.

Path Selection in the Visualization Tool

Figure 3A:
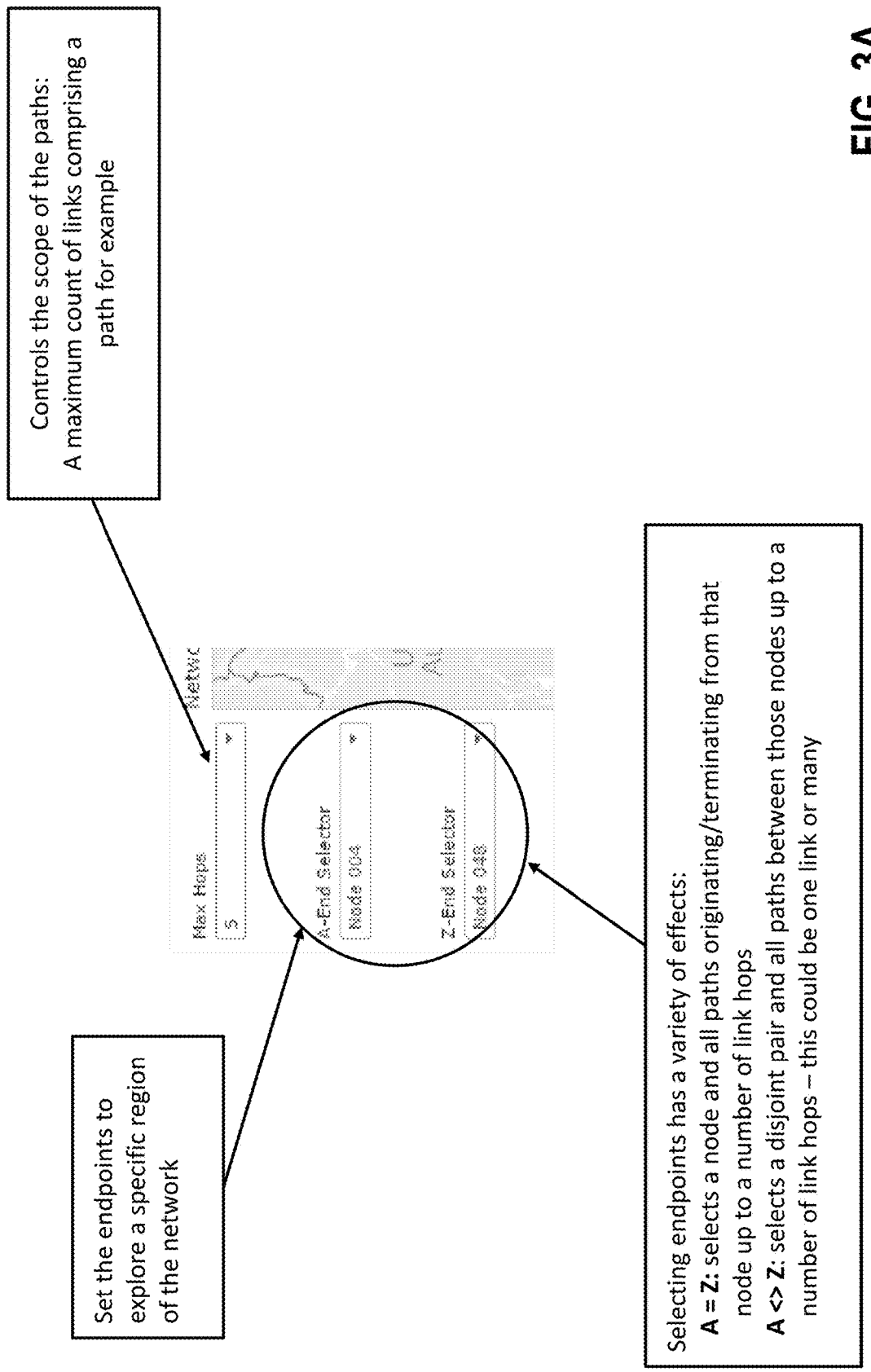
FIGS. 3A-3B are screen shots of an exploded view of the GUI of the visualization tool illustrating path selection.
Figure 3B:
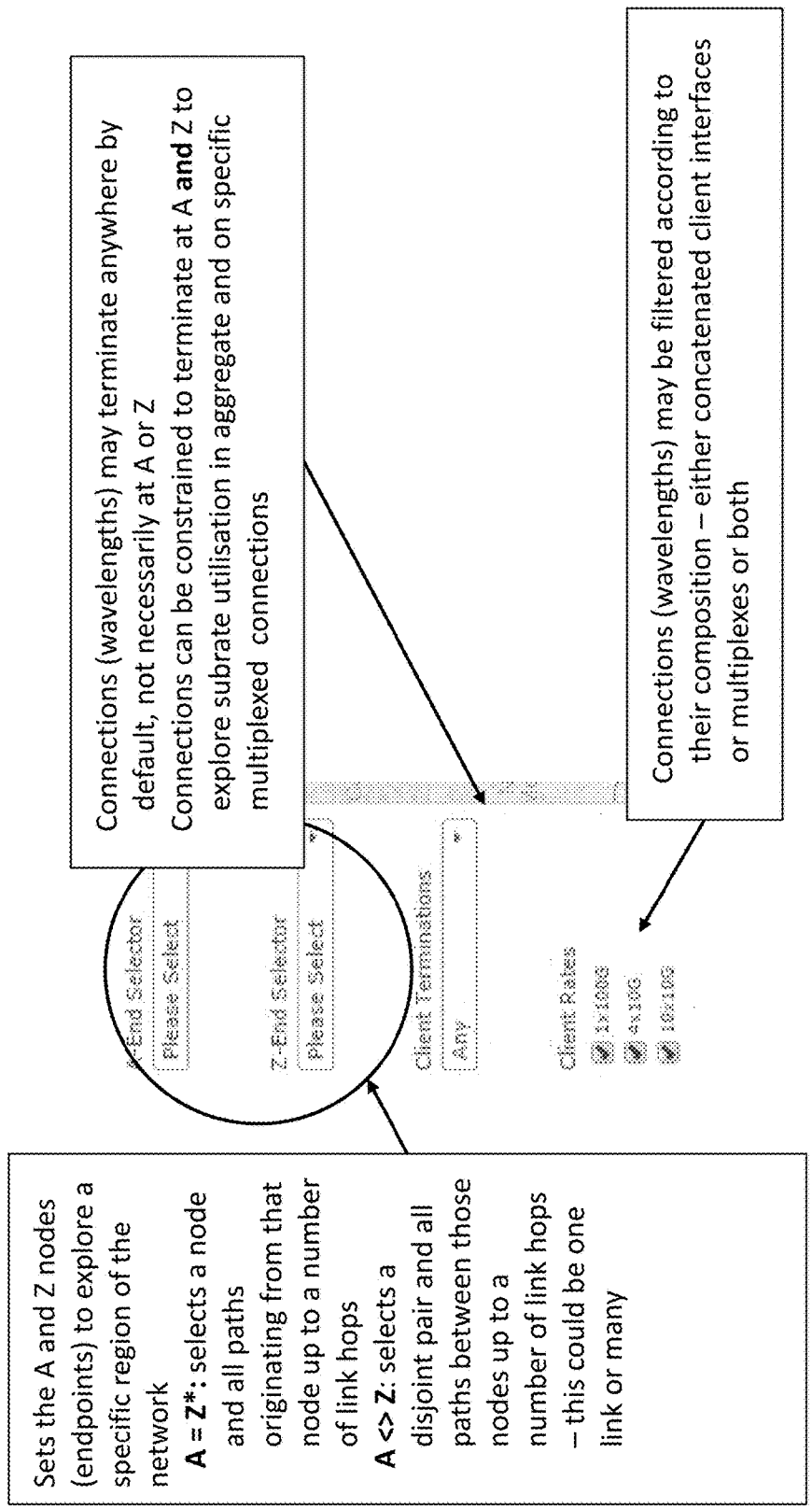

Referring to FIGS. 3A-3B, an exemplary embodiment illustrates an exploded view of the GUI of the visualization tool illustrating a means of path selection. The path selection is performed using inputs in the GUI including optionally a maximum number of hops. The maximum number of hops controls the scope of allowable paths, i.e., a maximum count of links in the path(s) from A to Z. The endpoints A and Z thereby enable exploration of a specific region of the network. Selecting certain endpoints may have a variety of effects: For example: A=Z selects a single node and all paths originating and/or terminating from that node up to a number of link hops; A< >Z selects a disjoint pair of endpoints and all paths between those nodes up the desired maximum number of link hops—this could be one link or many. For example, the selection displayed in FIG. 3A would filter all possible paths between Node 004 and Node 048 that can be reached in 5 link hops or fewer. Paths may also be selected individually or as a subset (more than one) of the allowable paths. Key metrics and associated demands (wavelengths) are also displayed for any endpoint selection, reflecting the current status of the active network.

Other processes of constraining the allowable paths are possible such as distance along the path, end to end delay A to Z, optical link budget or any other cost or reachability metric per link or per total path or per node transited. For example, a certain optical reach constraint for a path may be defined by the rate in bits per second and its associated maximum distance. Particular regions between A and Z or multipoint regions A, B, C . . . taken pairwise may be used to define allowable paths, and these may be computed and then filtered and or constructed literally by selecting mapped nodes or links.

In FIG. 3B, by default connections (wavelengths) may terminate anywhere by default, not necessarily at any particular selected combination of A and Z (i.e. a connection may only traverse a subset of the current set of selected links and/or terminate elsewhere). Connections can be optionally constrained to terminate at A and Z only. This allows the user to explore specific coterminating connections, but also where these are multiplexed wavelengths, the particular subrate utilization in aggregate as well as on individual multiplexed connections. The connections (wavelengths) may be filtered according to their composition—either concatenated client interfaces or multiplexes or both.

Selection of A and Z will show all computed links and the allowable paths between A and Z. The spectral usage, key metrics and associated connections (wavelengths) are displayed for this same selection reflecting the current status of the network. Paths and/or links may then selected, and their spectral use can be shown collectively or individually.

Network Map—Selections and Utilization

Figure 4A:
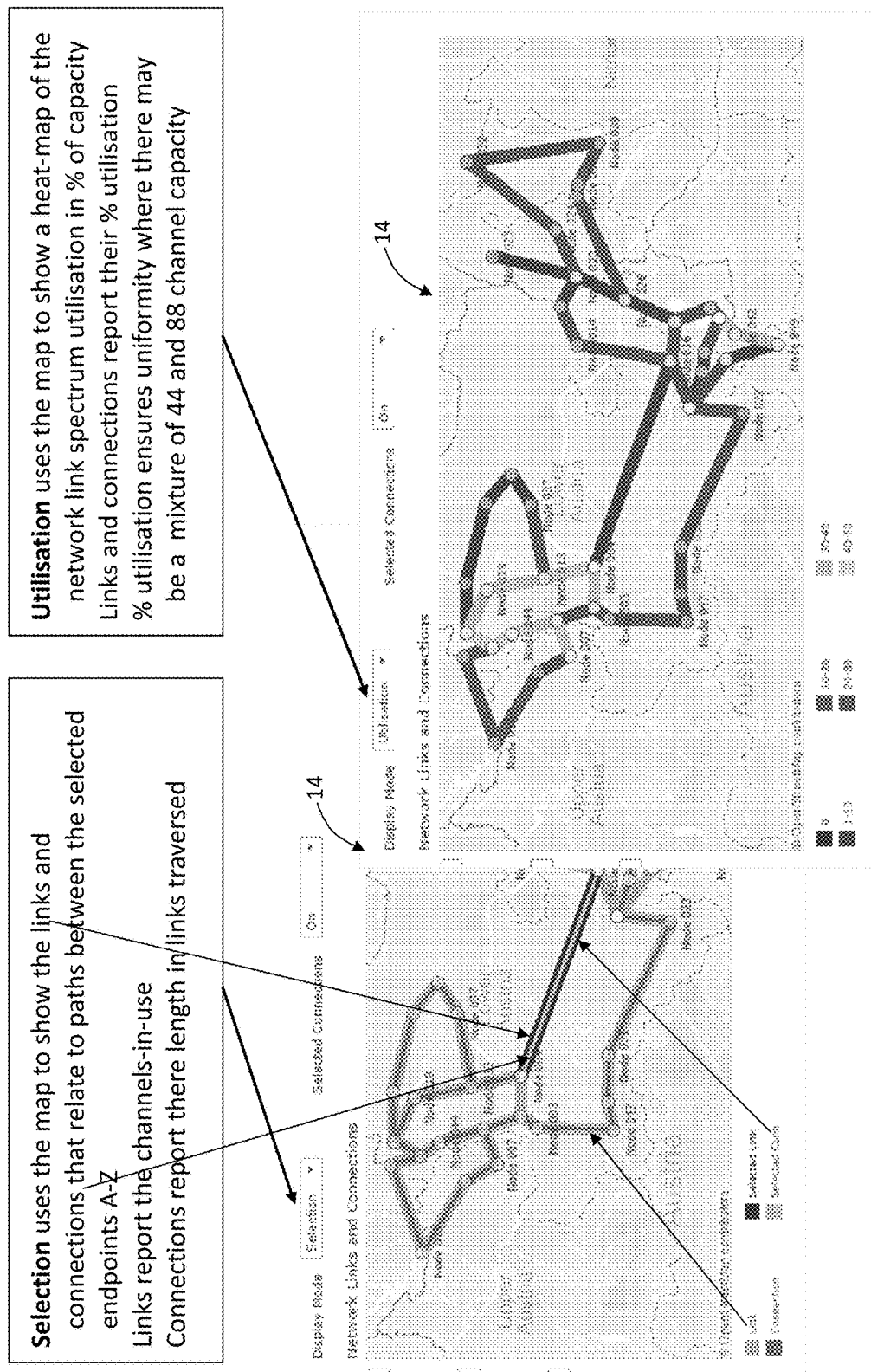
FIGS. 4A and 4B are screen shots of a network map for the GUI of the visualization tool.
Figure 4B:
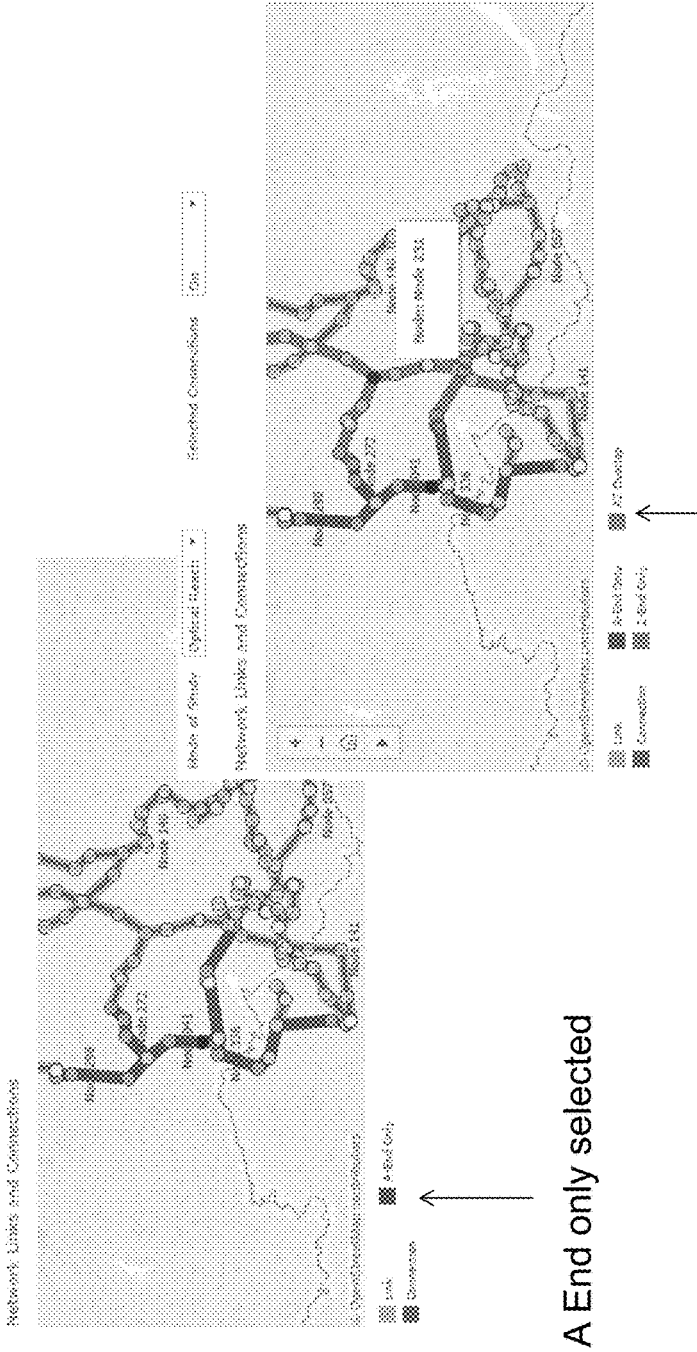

Referring to FIGS. 4 and 4B, an exemplary embodiment illustrates the network map 14 for the GUI of the visualization tool. The network map 14 is a visualization of the nodes and links and can be shown on a geographical map in the background, providing a view of the relative location of nodes and the links that join them. One network map 14 can be shown in several modes—in particular selection (spectrum), optical reach, and utilization—which saves space and also addresses particular purposes for the one visualization tool. For example, selection mode, shown on the left, uses the network map 14 to display the selected links and connections that relate to paths between the selected endpoints A-Z. The links report the channels-in-use and the connections report their length in links traversed. The utilization mode, shown on the right, uses the map to show a heat map of the network link spectrum utilization in % of capacity. Links and connections report their % utilization too, and % utilization ensures uniformity where there may be a mixture of 44 (100 GHz spacing) and 88 (50 GHz spacing) channel capacity, or flexible grid utilisation. The network map 14 can be zoomed and panned. Clicking on a link will highlight the link in the links and paths listing 18. Lassoing nodes will show a spider diagram of all links and connections that connect to or pass through that node. Lassoing may also be used to provide selection of more than one pair of endpoint nodes A and Z. The Optical Reach mode, shown on FIG. 4B, uses the network map 14 to display the links that are within optical reach of a particular node for the wavelengths of a particular maximum bit rate. Links are replaced with destination nodes listing, and the maximum wavelength bit rate that can be used to reach them. This usefully shows how far and how fast a wavelength can be before a regeneration is required. A and Z in Optical Reach mode can be separated beyond the reach of a wavelength even at the lowest desired bit rate, in which case network map 14 will show the links each of A and Z may reach individually, but more significantly where their optical reach overlaps—mutually reachable links and nodes. This is extremely useful for planning where to locate regenerators.

Figure 5:
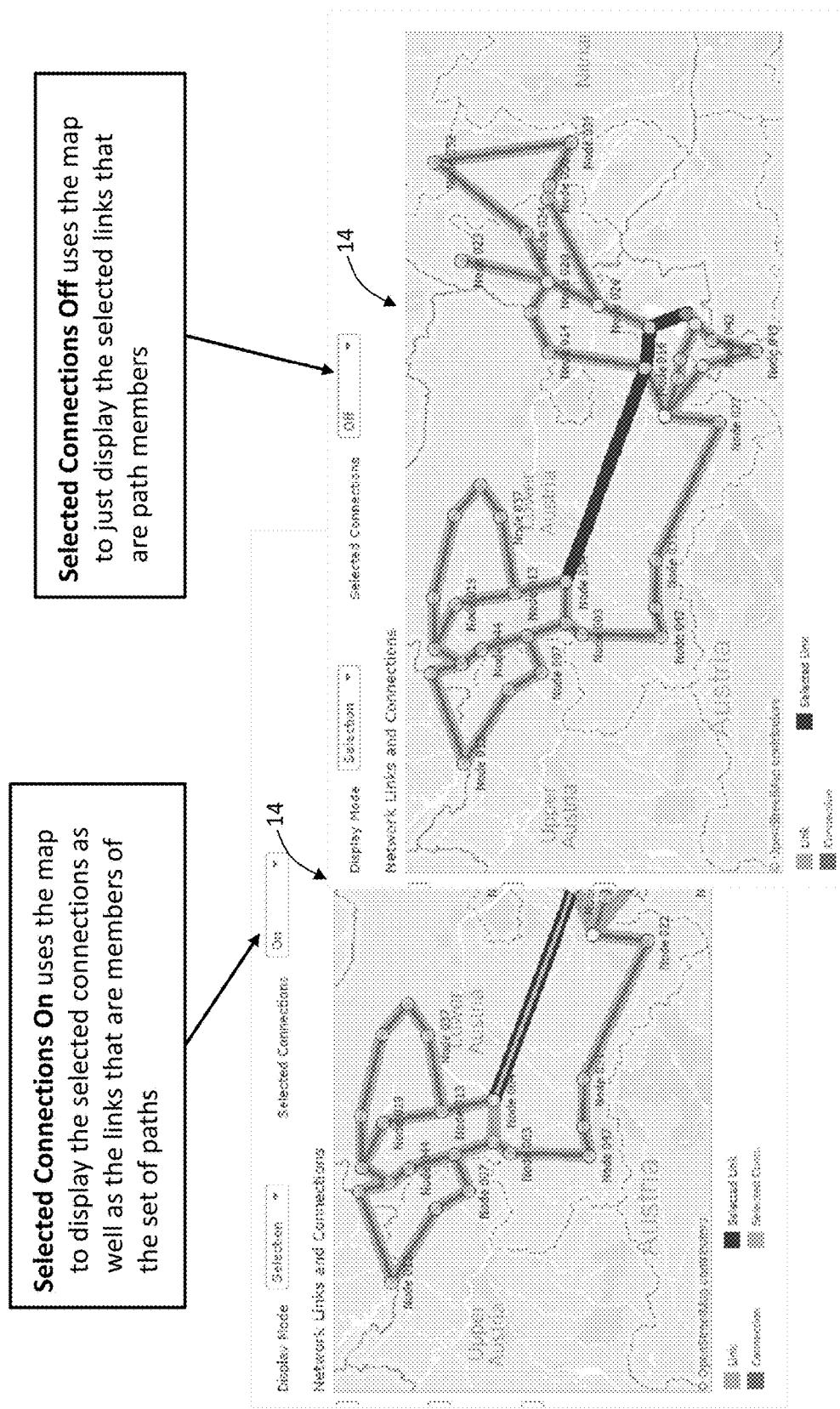
FIG. 5 is a screen shot of the network map further illustrating the selections from FIG. 4.

Referring to FIG. 5, an exemplary embodiment illustrates the utility of the network map further for link selections. In FIG. 5A, specifically, the selections can include a Selected Connections ON (left side) and OFF (right side) input. The Selected Connections On uses the map to display the selected connections as well as the links that are path members. The Selected Connections Off uses the map just to display the selected links that are path members.

Channel Usage Frequency—Circular Histogram

Figure 6:
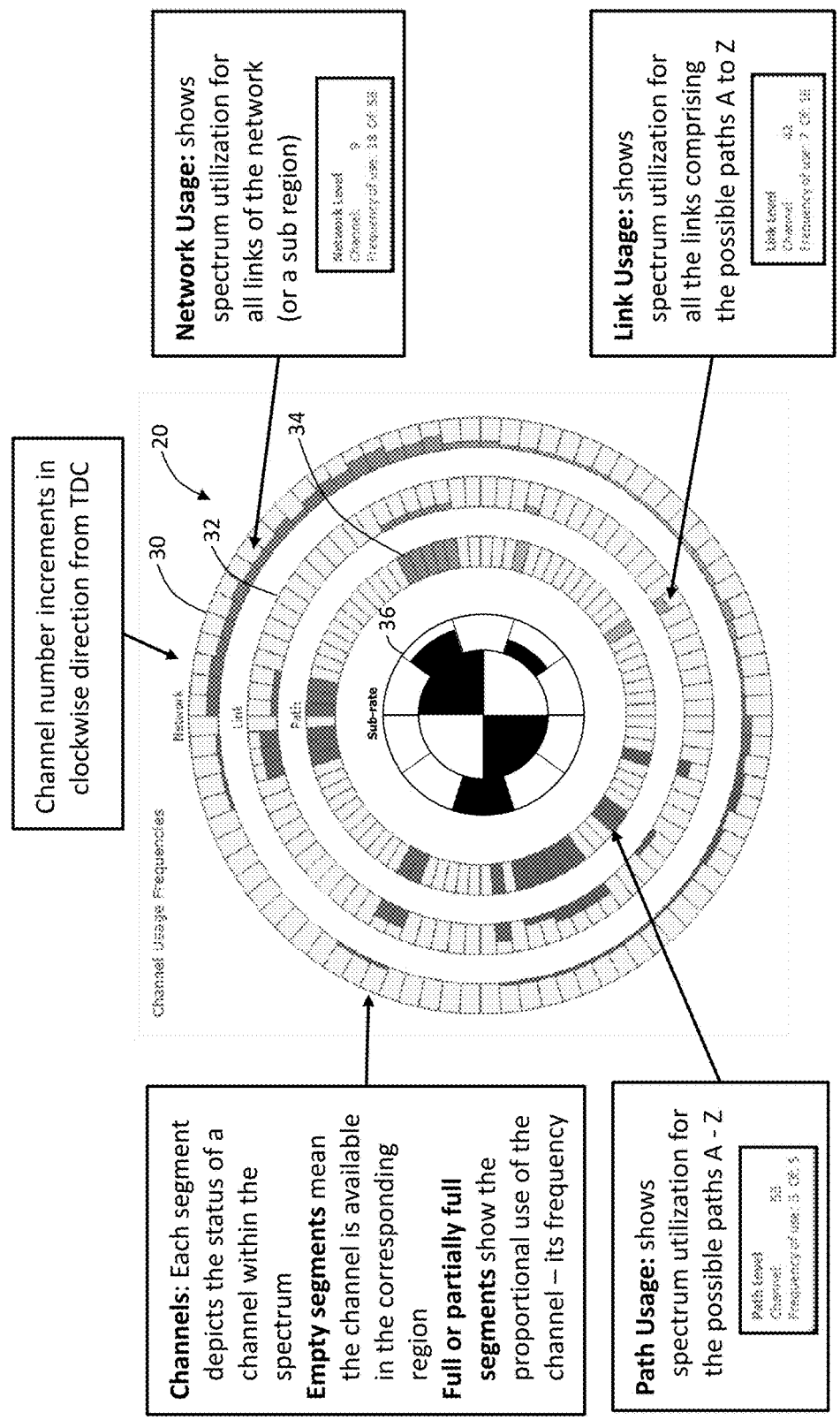
FIG. 6 is a screen shot of an exploded view of the GUI of the visualization tool illustrating a circular histogram of channel usage frequency.

Referring to FIG. 6, an exemplary embodiment illustrates an exploded view of the GUI of the visualization tool's circular histogram that depicts channel usage frequency. The circular histogram 20 is a circular bar graph providing a convenient visualization of channel usage frequency, i.e., how often a channel (a portion of the spectrum) is used in the network. The circular histogram 20 is compact, providing a visualization of a vast amount of information without the need to scroll or page through other displays. The outer circle 30 or ring is network usage showing spectrum utilization for all links of the network (or a selected sub-region). The middle circle 32 or ring is link usage showing spectrum usage for all links including all the possible paths between the endpoints A, Z, and the inner circle 34 or ring is path usage showing spectrum utilization for a possible path between the endpoints A, Z. Also, the circular histogram 20 can include another inner circle graph 36 of sub-rate utilization.

Thus, the circular histogram 20 provides a holistic view of A-Z spectrum allocation by network, path, link and also by wavelength multiplex (circle graph 36). Selecting a segment (channel or port) filters the connections list to those using that channel, and highlights the footprint of that channel on the links of the network map 14. Selecting any connection will highlight its channel on the circles, and if also a multiplex, its port availability. This allows exploration of regional compliance, and routing and use of channels and multiplexes to improve spectrum efficiency.

In the all of the circles 30, 32, 34, 36, each segment depicts the status of a channel within the spectrum. Empty segments mean the channel is available in the corresponding region. Full or partially full segments show the proportional use of the channel, i.e., the frequency of use. The channel number can increment from the clockwise direction from Top Dead Center (TDC). The circular histogram 20 provides instant feedback on Spectrum allocation. Selecting any segment (channel) from the display will filter all connections using that channel in the region, and highlight the path/link footprint of the channel on the network map 14 (available, not available).

Selected Link Listing

Figure 7:
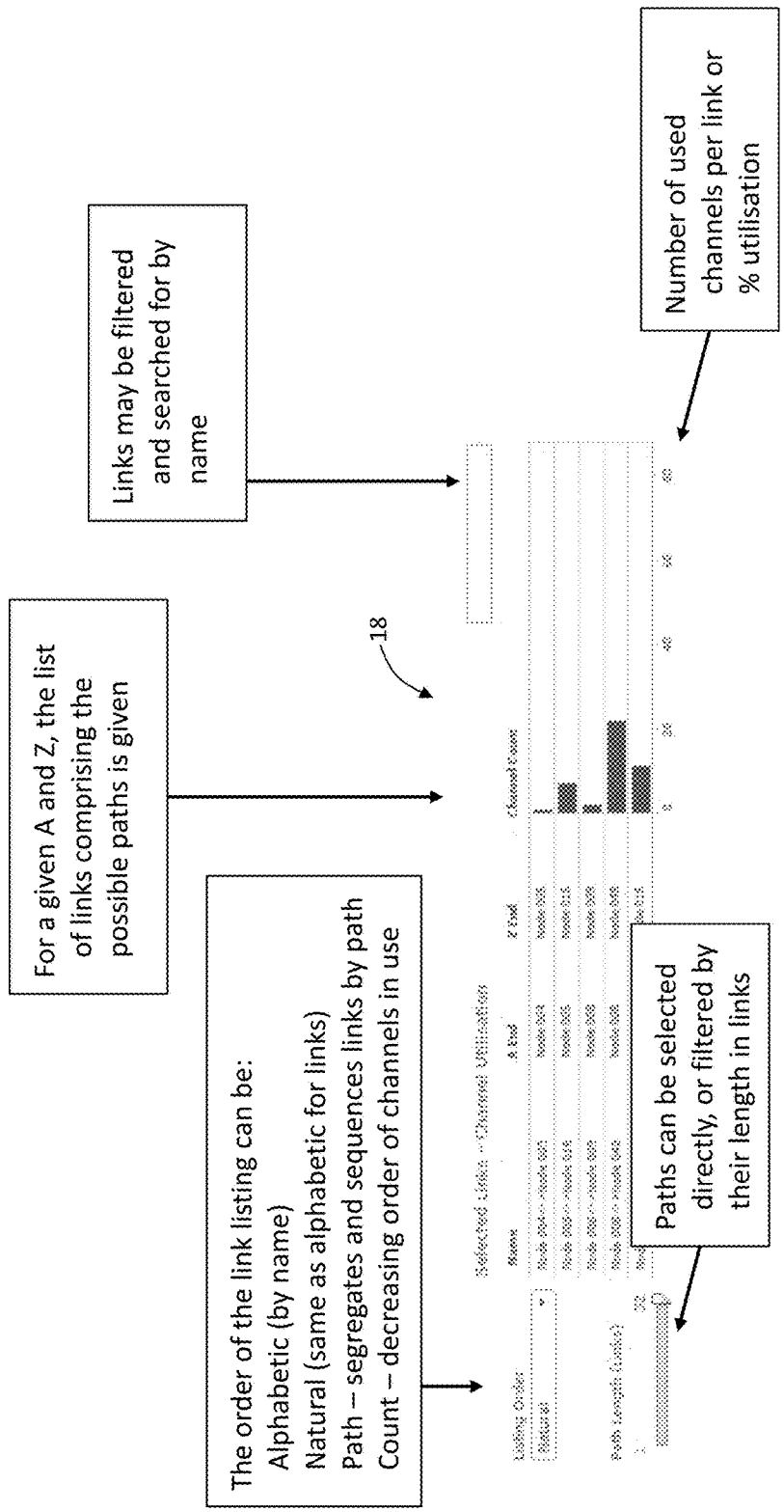
FIG. 7 is a screen shot of an exploded view of the GUI of the visualization tool illustrating selected link listings.

Referring to FIG. 7, an exemplary embodiment illustrates an exploded view of the GUI of the visualization tool illustrating selected link listings in the the links and paths 18. Specifically, any link can be selected in the GUI, such as through a point-and-click or touch operation on the links and paths listing 18. That is, clicking on one or more link name will highlight the link on the network map 14, the lit channels on that link in the circular histogram 20, and also filter the demands (connections) which are using that spectrum. This mode allows determining used and available spectrum on one or more links. A succession of concatenated links may be used to form an ad hoc path, in which case the display will show used and available spectrum along the entire path. The order of the listing can be Natural (by identifier or by each path in link stitching order), Alphabetic (by name), Count (in decreasing order of lit channels, etc. For a given endpoint A and Z, the list of links including the possible paths is given, links may be filtered and searched for by name, and a bar chart can provide a channel count of the number of used channels per link or percentage utilisation.

Selected Connection Listing

Figure 8A:
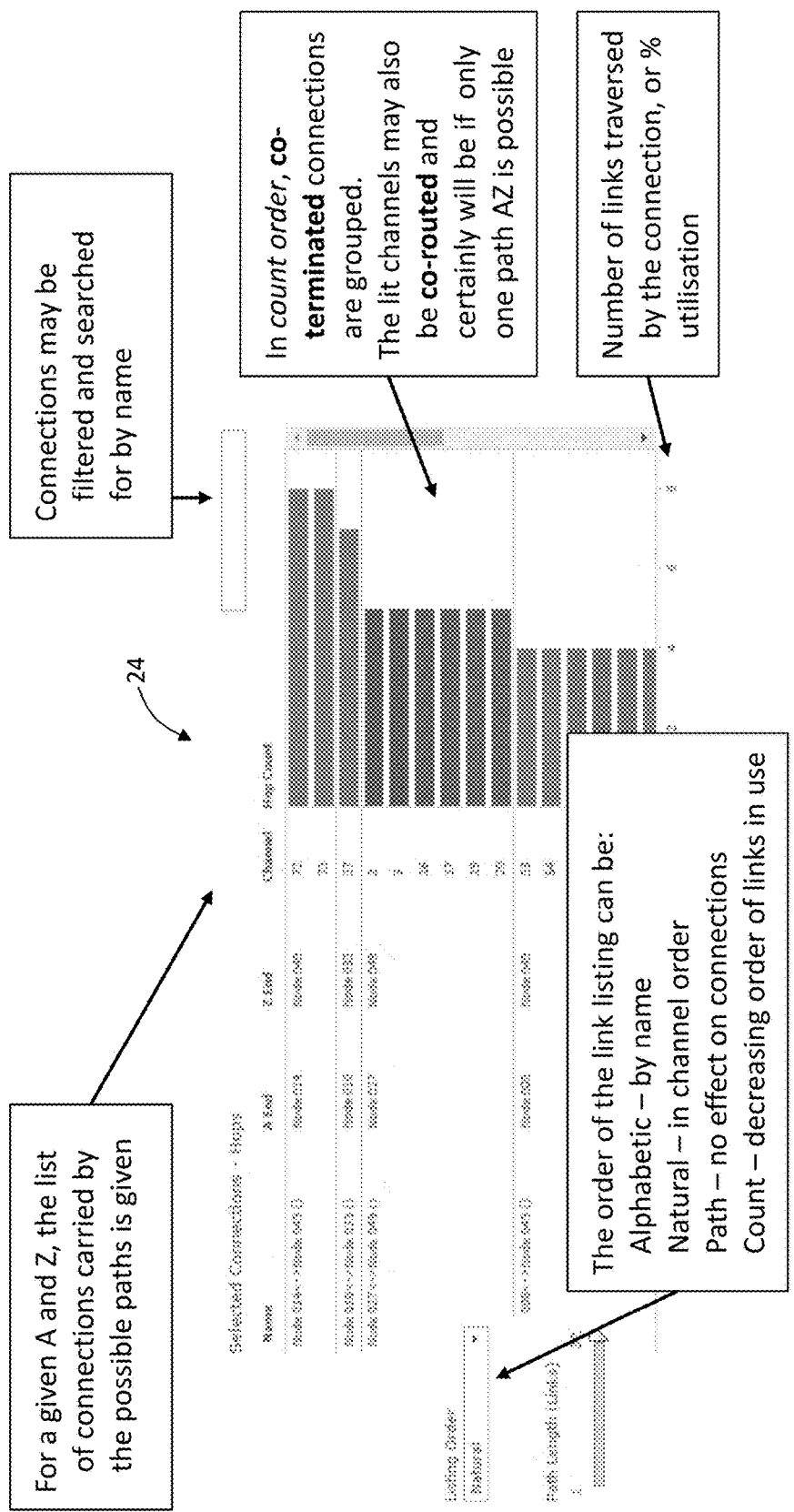
FIGS. 8A and 8B are screen shots of an exploded view of the GUI of the visualization tool illustrating selected connection listings.

Referring to FIG. 8A, an exemplary embodiment illustrates an exploded view of the GUI of the visualization tool illustrating selected connection listings. Clicking on one or more connection name will highlight their route on the network map 14, and also filter the links which carry them on the network map 14 and the Links Listing 18. This mode allows determining how spectrum has been literally allocated and to trace demands. For a given endpoint A and Z, the list of connections carried by the possible paths is given. The connections may be filtered and searched by name. Co-terminated demands are preferentially grouped. The lit channels may or may not be co-routed unless of course there is only one possible path. Finally, a bar chart illustrates the number of links (i.e., hop count) traversed by each connection or a percentage utilisation. The order of the listing can be Natural (by channel identifier), Alphabetic (by name), Count (in decreasing order link hops, etc.

Selected Node Listing

Figure 8B:
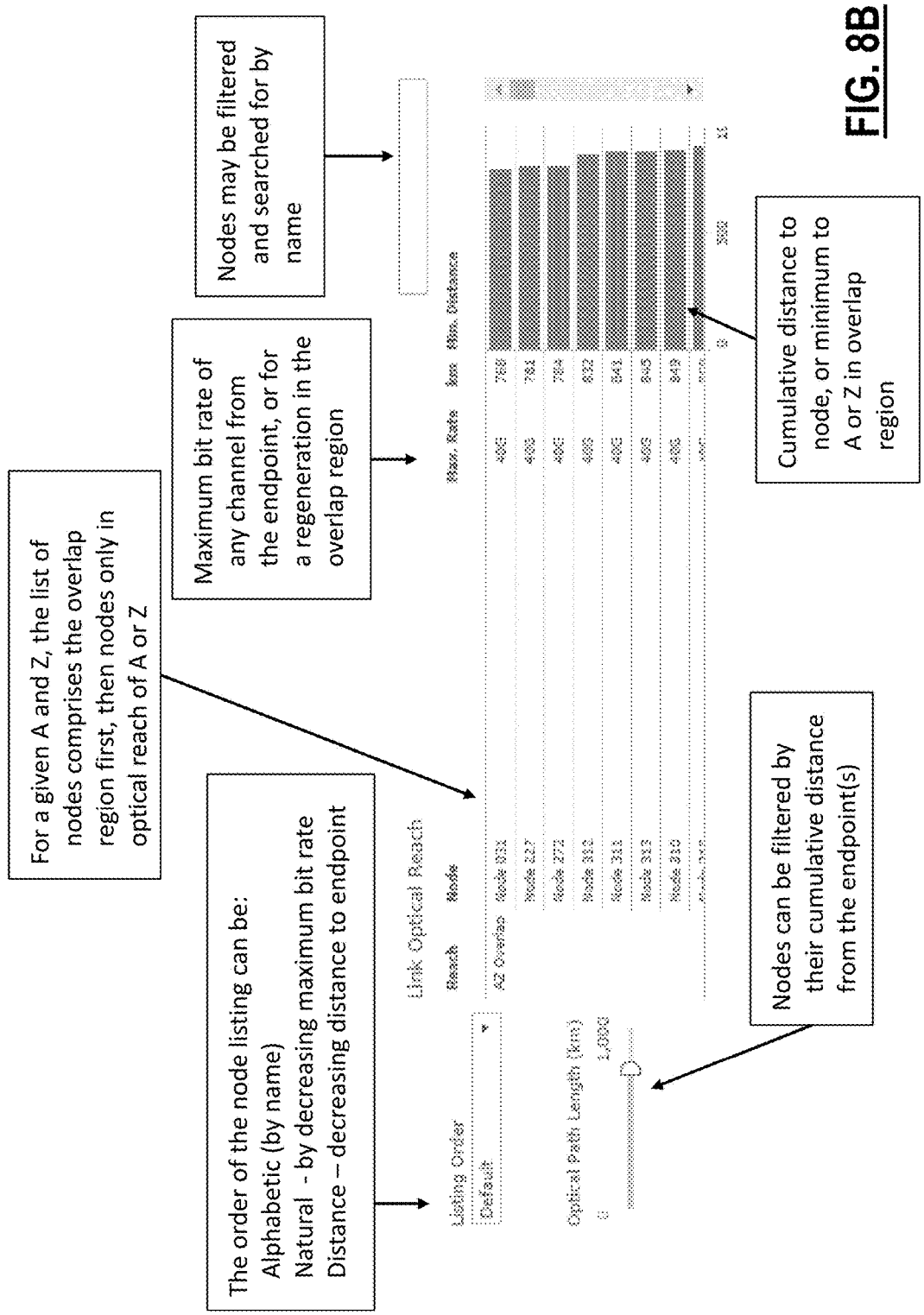

Referring to FIG. 8B, an exemplary embodiment illustrates an exploded view of the GUI of the visualization tool depicting selected nodes listings. This appears in lieu of the links listing in Optical Reach mode, or could be displayed simultaneously. Clicking on one or more nodes will highlight their location on the network map 14. This allows nodes to be selected by the maximum optical bit rate they can be reached from a source node, or by their distance or position in an overlapping region of the optical reach of two distant endpoints and their suitability for regeneration determined. The order of the listing can be Natural (by maximum bit rate), Alphabetic (by name), Count (in decreasing order of distance, etc.

Network Utilization Metrics

Referring to FIG. 9, an exemplary embodiment illustrates an exploded view of the GUI of the visualization tool depicting the utilization and efficiency metrics 22. For example, the metrics can include network used spectrum, the link used spectrum (same as the path used spectrum, as the selected paths comprise preferentially the selected links at all times), link connection hop efficiency, and link connection termination efficiency, all displayed visually. The network used spectrum is the count of distinct channels (wavelengths) used at least once among all the links of the network (or a sub-region). The link used spectrum is the count of distinct channels (wavelengths) used at least once among all the links of the allowable paths A—Z (also Path Used Spectrum). The link connection hop efficiency is the ratio between the total hops used by the selected connections and the total hops of their shortest possible paths. The link connection termination efficiency is the proportion of the selected connection terminations that are at selected termination endpoints A and Z. Used Spectrum counts (network, sub-region, link, path) are a ready means of determining utilization at different levels of scope and may be expressed as channels in a fixed grid system or by any other measure of used spectrum in flex grid and other more continuous spectra. Connection hop efficiency is a ready indication of how closely demands use their shortest path, which is the ideal for localized spectrum efficiency and utilization. Connection termination efficiency readily determines the volume of transiting (non-terminating) demands in a selected region, which could be candidates for rerouting more efficiently.

Network Utilization Metrics—Blocking Probability

Figure 10A:
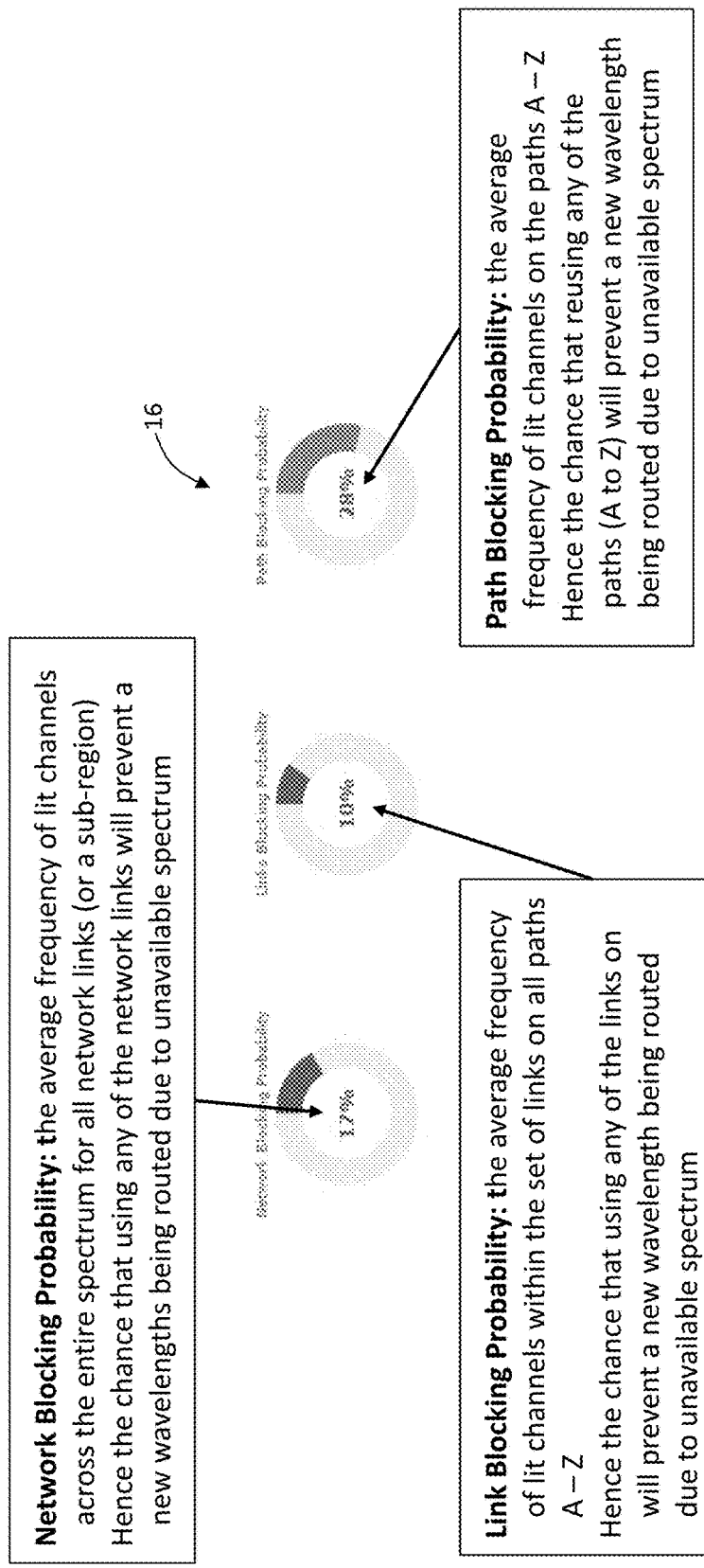
FIGS. 10A and 10B are screen shots of an exploded view of the GUI of the visualization tool illustrating network utilization metric for blocking probability.
Figure 10B:
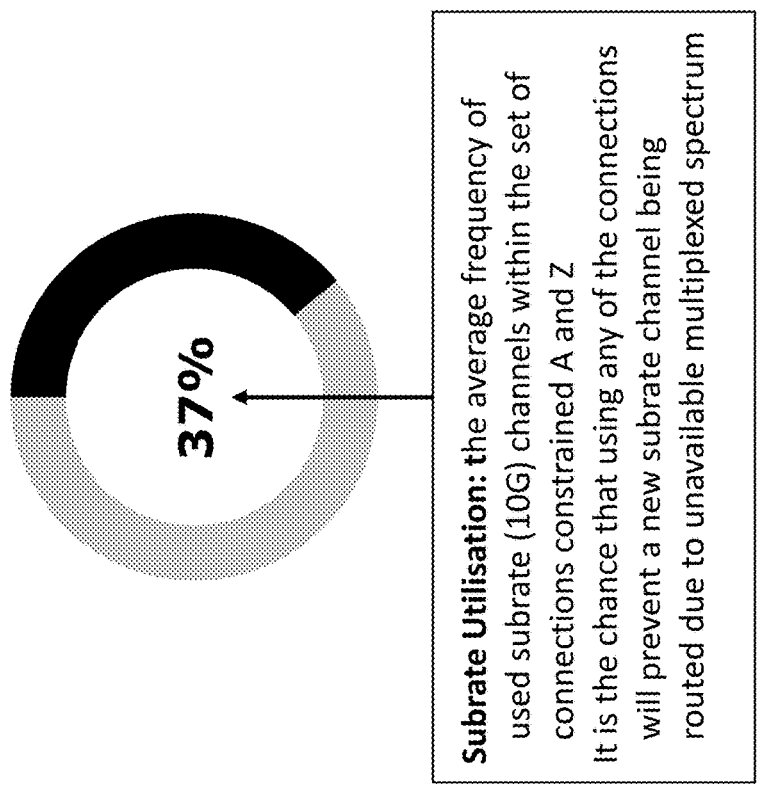

Referring to FIGS. 10A and 10B, an exemplary embodiment illustrates an exploded view of the GUI of the visualization tool depicting metrics for blocking probabilities 16. The network blocking probability 16 is the average frequency of lit channels across the entire spectrum for all network links (or a sub-region). Hence, the chance that using any of the network links will prevent a new demand being routed due to unavailable spectrum. The link blocking probability is the average frequency of lit channels within the set of links comprising the possible paths A-Z. Hence, the chance that using any of the links on the possible paths will prevent a new demand being routed due to unavailable spectrum. The path blocking probability is the average frequency of lit channels on the possible paths A-Z. Hence, the chance that reusing any of the paths will prevent a new demand being routed due to unavailable spectrum. Blocking probabilities are a ready means for assessing spectral efficiency and utilization and may be calculated on the complete or just the used spectrum, and calculated on channelized fixed grid, flexible grid and more continuous spectra. Network (or sub-region), link and path allow different scopes to be quickly assessed. A particular path may be desired, and it is instantly known what the chance of using it will be. All metrics may be used to drive optimization of the spectral efficiency at the corresponding scope.

Present Versus Optimized Modes of Operation

Figure 11:
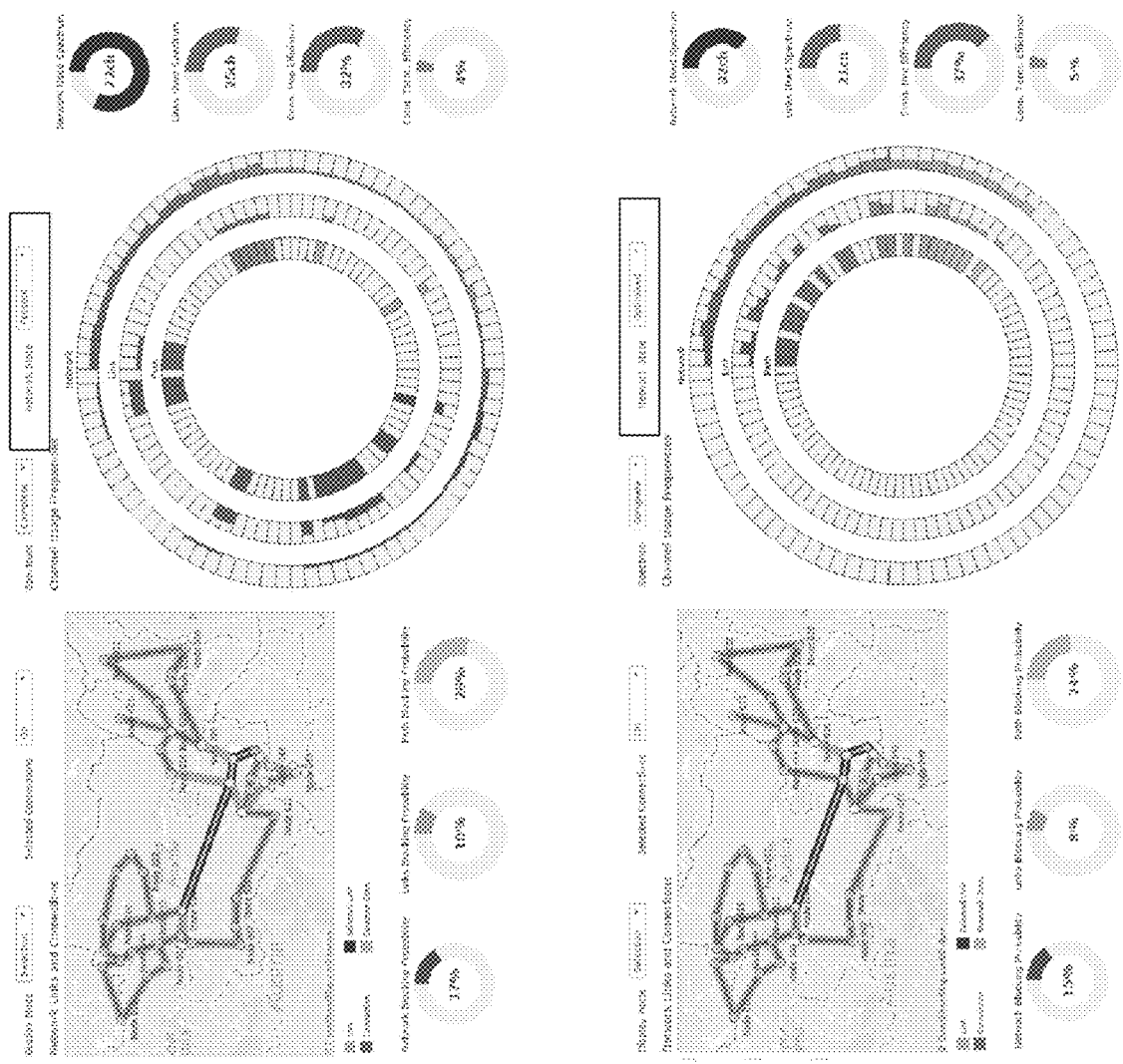
FIG. 11 is screen shots illustrate two GUI views of the visualization tool in a present mode and an optimized mode.

Referring to FIG. 11, an exemplary embodiment illustrates two GUI views of the visualization tool in a present mode (top) and an optimized mode (bottom). Optionally, an optimization capability can use the metrics as a cost function to improve the spectrum efficiency or link utilisation, or by the number of terminations and or the number of transit connections and or the length of connections in a selected region, and the tool provides a ready means of visualizing how well operations in the present network (existing demands) are tracking an optimized ideal. The visualization tool can assist in rerouting and reassigning the demands to minimize used spectrum, used channels per link, and has the aim of balancing an even distribution of channel use over all links. Many other optimization strategies are possible—optimize a region; optimize a fraction of demands and or restrict the number of changes; reroute but do not reassign channel; reassign channel but do not reroute; consolidate wavelengths to one or more of a higher bit rate, and provide stepwise moves towards optimization and or determining the process of the most beneficial first step, second beneficial step and so on. The optimization may also be used in an advisory capacity for new channel adds only, with or without periodic optimization, to better track an ideal. Optimisation may also be used at the subrate level to improve utilisation of multiplexed wavelengths or to consolidate corouted and or coterminated subrates on to higher bit rate channels and thereby free up spectrum.

Extensions

The visualization tool can also include various extensions including a selection of more than two endpoints to define a region or sub-region. Such selection can be via a point and click, a touch operation, a lasso, a highlight, or any other type of GUI selection technique. Using more than two endpoints can result in a superimposition of the spectrum of the possible paths between endpoints taken pairwise, the superimposition avoiding double counting of metrics. The visualization tool can also support a listing of the paths, as well as being shown on the map as illustrated herein. Further, the visualization tool can support the selection of one or more paths from a listing to constrain scope further to filter the selected links and connections further and highlight the map.

The visualization tool can use one or more databases, such as obtaining provisioned channels from a Network Management System (NMS); Element Management System (EMS); a planning tool; the nodes themselves in the network; a control plane; a Software Defined Networking (SDN) controller or orchestrator, or the like. In this manner, the visualization tool is able to present a vast amount of complex data from one or more data sources in an easily consumable fashion, and may superimpose one or more data sources. In addition to provisioned, active channels in a network, the visualization tool can depict planned demands, such as from a planning tool, enabling the use of the tool as a planning aid to add/move/delete demands being transactionally aligned with the active network database, or independent.

Also, the visualization tool can include features such as restricting demands only to terminate at the endpoints A, Z or on the same path A-Z to reveal co-terminated and/or co-routed demands following the set of allowable paths respectively. Such a capability can be used to drive optimization processes to improve utilisation and or spectrum fragmentation and or subrate utilisation, including the use of super-channels or adaptive bit rate channels in gridless and more fluid optical network implementations. The visualization tool can also support detailed displays of information such as multiplexed channels and their utilization.

The visualization tool may be used on samples of data or connected to a live network database that may be being updated from a variety of different sources. There is no limitation on the visualization tool's ability to provide real-time display promptly reflecting changes in underlying data.

The visualization tool may be used to depict and designate associated utilization for example wavelengths and other optical resources providing protection paths, and in conjunction with optimization capabilities re-plan or advise on diverse path routes for protection purposes, without limitation.

Subrate Channel Usage Frequency

Figure 12:
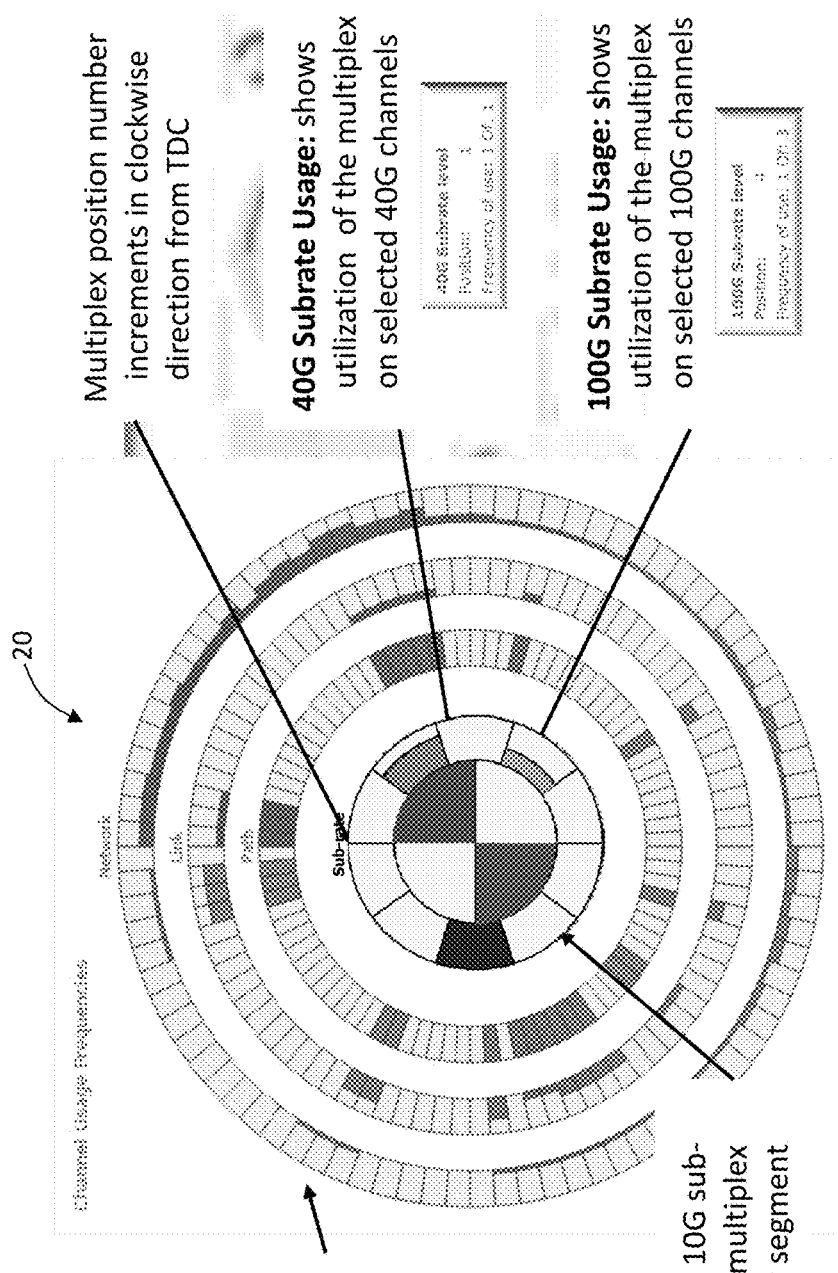
FIG. 12 is a screen shot illustrates an exploded view of the GUI of the visualization tool illustrating a circular histogram for subrate channel usage frequency.

Referring to FIG. 12, an exemplary embodiment illustrates an exploded view of the GUI of the visualization tool illustrating a circular graph 36 for subrate port usage frequency. Specifically, the circular histogram can include a fourth interior circular graph 36 for subrate spectrum allocation. Selecting any segment (port) from the sub-rate display will filter all multiplexed connections with that port in use in the selected region. Selecting any multiplexed connections(s) (wavelength) will highlight the port availability in those connection's multiplex. This allows exploration of the routing and use of multiplexes to improve subrate spectrum utilization efficiency. Multiple inner circular graphs can be provided to illustrate the usage of mixed subrates and or subrate multiplexes (for example two circles might be used to distinguish the usage of two different subrate multiplex port cards e.g. 4 ports×10G and 10 ports×10G or two circles might be provided to illustrate usage of two different subrates for example 10 ports×10G and 4 ports×25G).

Mixed Grid Networks

The visualization tool also includes the ability to have mixed grid spacing. For example, some links/paths could be 44 channels (100 GHz grid), and some could be 88 channels (50 GHz grid). These are readily combined in the visualization tool, either by making the 44 channels the odd numbered segments (alternate segments in an 88 channel circular histogram display), or for example by making them the first 44 of an 88 channel display. Either way, the general principle is that each segment depicts a ratio of links/paths with that channel in use divided by the total number of links of that category. So in the example of the 44 channels being the odd numbers and combined with 88 channel systems, the total links will simply reflect the count of the entire set of 44 and 88 links for the odd channels, but only the total number of 88 channel links for the even channels. For example, if there were two 44 channel links, and six 88 channels links, then the segments representing both the 44 and 88 would be a frequency out of eight links, and for those segments only on the 88 systems, the frequency would be out of a total of six links. The same is possible for 10G subrates in a mix of 40G and 100G multiplexes. Those skilled in the art will appreciate that this principle may be applied in a variety of ways. Furthermore, in homogenous networks of 44 channels, the segment count could be simply 44, and similarly for 40, 88, 96, 106 channels the segment count may be used to match the systems, or match any hybrid grid networks with an appropriate assignment of segments to suit the systems in use.

Routing and Wavelength Assignment (RWA) and Routing and Spectrum Assignment (RSA)

Routing and Wavelength Assignment (RWA) is a well-known problem for fixed grid optical networks while Routing and Spectrum Assignment (RSA) is the equivalent terminology to address the same problem for flexible grid optical networks, or gridless optical networks. Variously, RWA and RSA are automated techniques to find spectrum or channel assignments in some optimal manner, against any feasibility constraints such as optical link budgets and equipment availability. It is expected that connections and wavelength (channel, spectrum) assignments will utilize these automated techniques increasingly, and manual assignments less so, as optical networks become more complex in topology (interconnected meshes with Reconfigurable Optical Add/Drop Multiplexers (ROADMs)) and with increasing channel and spectrum complexity (flex grid and gridless). The visualization embodiment described herein readily augments and complements these automated techniques, providing a single GUI for interaction therewith as well as convenient visualizations to illustrate the various results of RWA and RSA optimizations. For example, the visualization tool can include functionality to implement the various RWA and RSA optimization techniques as well as visually displaying final or intermediate results. This can be used at a planning stage to determine which strategies and goals to optimize toward or the like.

Circular Histograms—Other Types of Traffic

In the various exemplary embodiments described herein, the circular histograms are illustrated with respect to wavelengths. Those of ordinary skill in the art will recognize that this visualization technique can also be used with other granularities of network resources including, for example, Optical channel Transport Units (OTU), Optical channel Data Units (ODU), packets, and the like. Also, the circular histograms can be used to present network resources concurrently at multiple layers, such as wavelengths, OTU/ODU, packets, etc. thereby visualizing how resources are assigned, interact, etc. For layers that do not have a predetermined allocation of containers, the number of segments per circle can be determined dynamically.

Process for Visually Presenting Spectrum Usage in an Optical Network

Figure 13:
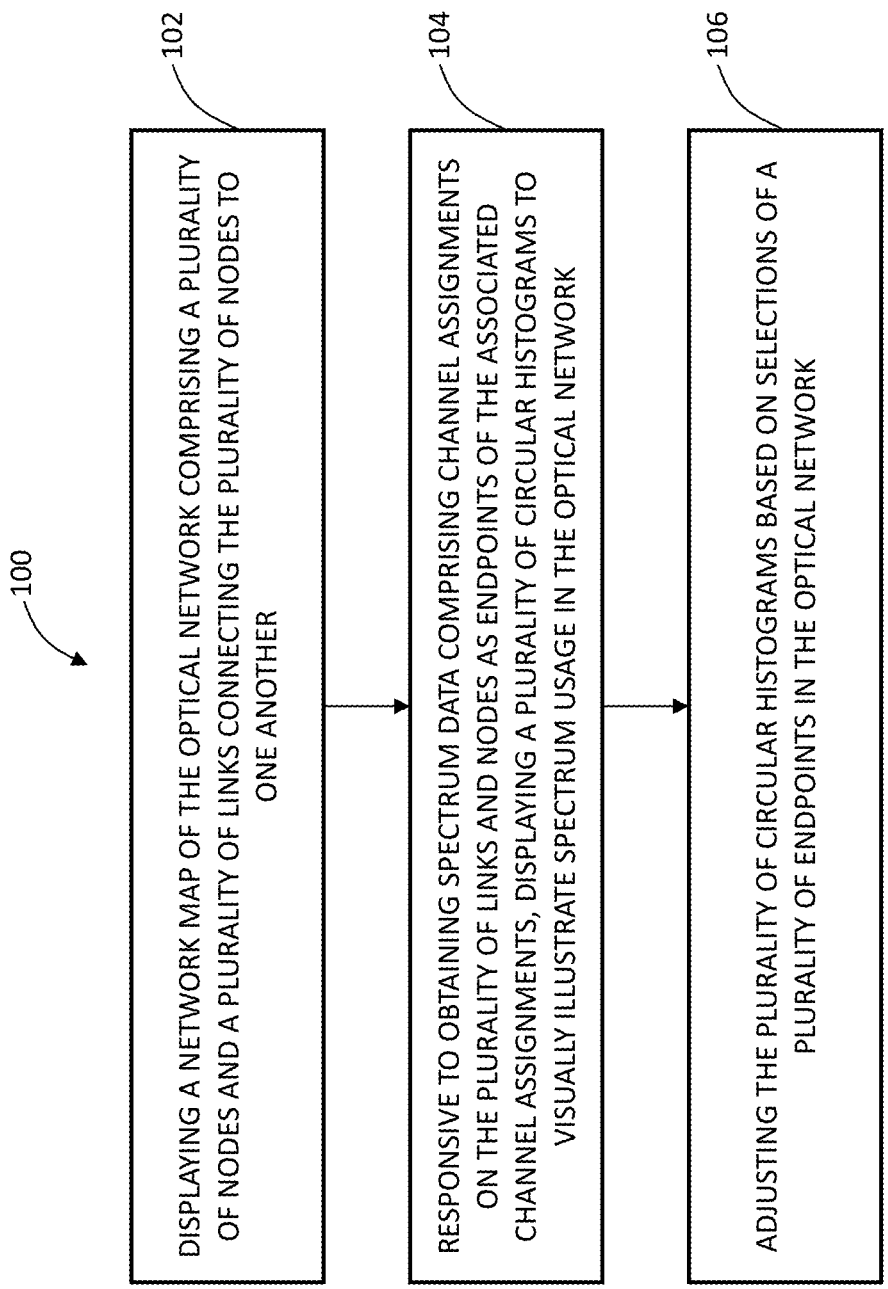
FIG. 13 is a flowchart of a computer-implemented process for visually presenting spectrum usage in an optical network.

Referring to FIG. 13, in an exemplary embodiment, a computer-implemented process 100 is illustrated for visually presenting spectrum usage in an optical network. The computer-implemented process 100 includes displaying a network map of the optical network comprising a plurality of nodes and a plurality of links connecting the plurality of nodes to one another (step 102); responsive to obtaining spectrum data comprising channel assignments on the plurality of links and nodes as endpoints of the associated channel assignments, displaying a plurality of circular histograms to visually illustrate spectrum usage in the optical network (step 104); and adjusting the plurality of circular histograms based on selections of a plurality of endpoints in the optical network (step 106). The plurality of circular histograms visually represent the spectrum usage by representing the optical spectrum in the optical network in a preferred clockwise direction, and wherein each portion or segment of the plurality of circular histograms represents one of a wavelength and a portion of spectrum.

The optical spectrum can be defined via one of a fixed grid, a flexible grid, and a combination of the fixed grid and the flexible grid. In fixed grid, the circular histograms can include a divider for each segment, and each segment can represent 50 GHz, 100 GHz, or a combination of $^{50}/_{100}$ GHz. In the combination of $^{50}/_{100}$ GHz, the segments can be 100 GHz and the data therein can be split in half to support mixed $^{50}/_{100}$ GHz deployments, or each segment 50 GHz and the 100 GHz systems only relating to the first half, or alternate segments as appropriate.

The plurality of circular histograms can be concentric to one another. The plurality of circular histograms can include a first circular graph, a second circular graph, and a third circular graph concentric to one another. The first circular graph represents the spectrum usage networkwide or for a defined or dynamically selected region of the network, and each segment in the first circular graph illustrating how much the segment is used networkwide, the second graph represents the spectrum usage on a sub-region of the optical network defined by the first circular graph, and each segment in the second circular graph illustrating how much the segment is used in the sub-region, and the third graph represents the spectrum usage on one or more paths of the sub-region of the optical network defined by the first circular graph, and each segment in the third circular graph illustrating whether the segment is used in the path(s). The plurality of circular histograms can further include a sub-rate circular graph on an interior of the plurality of circular histograms.

The computer-implemented process 100 can further include receiving selections of nodes and automatically updating the plurality of circular histograms based on the selections. The selections can be made via selected nodes in the network map, via a lasso of an area in the network map, and via inputs stating explicit A-Z nodes. The computer-implemented process 100 can further include determining and displaying a plurality of network utilization metrics comprising one or more of network used spectrum, the link used spectrum, link connection hop efficiency, and link connection termination efficiency. The computer-implemented process 100 can further include determining and displaying a plurality of blocking probabilities comprising an average frequency of lit channels across the optical spectrum for network links, and an average frequency of utilised ports across the multiplexes of lit channels of that type.

The computer-implemented process 100 can further include performing and displaying an optimization to compare the optical network at present versus an optimized configuration. The computer-implemented process 100 can further include, prior to the displaying steps, receiving network data from one or more of a Network Management System (NMS), Element Management System (EMS), a planning tool, a control plane, a Software Defined Networking (SDN) controller, and an SDN application. The spectrum usage in the optical network can illustrate a combination of 50 GHz fixed grid spacing and 100G fixed grid spacing.

Process for Performing Transactional Planning Modifications in an Optical Network Referring to FIG XX, in an exemplary embodiment, a computer implemented process is illustrated for transactionally modifying and assigning the use of resources of an optical network. The computer implemented process includes the steps described of FIG. 13 and extending them to record user interaction that selects resources not in present use for the purpose of putting them to use, for example the selection of two endpoint nodes A and Z, selecting a path between those node pairs, and determining by way of the circular graph and selecting a channel not presently assigned in the active network to establish a new wavelength of a certain rate. A further example would be the selection of two endpoint nodes A and Z, selecting a multiplexed existing connection that connects A and Z, and determining by way of the circular graph and selecting a subrate port not presently assigned in the active network to establish a new subrate connection of a certain rate. On making the choice the system may record the transaction in the underlying database in a manner that allows the visualization state to be updated to render, depict and include the new wavelength or subrate appropriately. Those of ordinary skill in the art will appreciate that deletions and modifications may be made in a similar manner. The system may also include the capability to reconcile such planning decisions with changes that may occur by other means to the state of the active network, such as by network protection switching on failure or through actions at an operations centre controlling the network's management system. The visualization tool may depict planning modifications in a distinguishable manner from the active network, and use such reconciliation means to determine when those planning decisions may have been committed in the active network, changing state from "planned" to "deployed", and many other mechanisms are possible. Furthermore, optimisation processes may be applied to advise and guide human operators in terms of the paths and connections they may select for new or modification purposes to ensure that the network remains close to optimal spectrum usage. Those of ordinary skill in the art will appreciate that such processes may be readily extended to full machine computation autonomy in the decision making process, and those actions may be driven by orders demanded of the network and executed for example through the orchestration means of software defined and virtualized networks.

Exemplary Server

Figure 14:
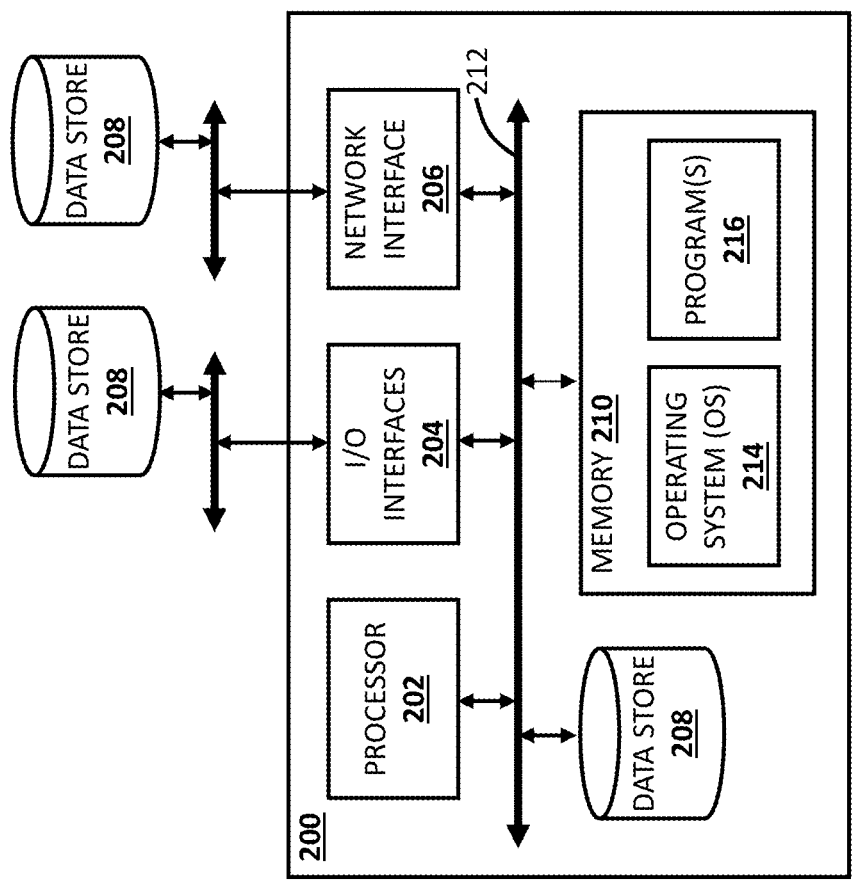
FIG. 14 is a block diagram of a server which may be used to implement the visualization tool and associated GUI.

Referring to FIG. 14, in an exemplary embodiment, a block diagram illustrates a server 200 which may be used to implement the visualization tool and associated GUI. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 14 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Further, in addition to the server 200, the visualization tool can be implemented in any type of computing device such as a laptop, desktop, tablet, mobile device, etc. In an exemplary embodiment, the visualization tool can execute on the server 200 which is communicatively coupled in some manner to the network to obtain the network database of connections. A user can access the visualization tool directly through the server 200 or via a networked connection to the server 200 through some other device. Preferentially this may be via a standard Internet client browser application. Other embodiments are also contemplated.

In an exemplary embodiment, the server 200 is configured to visually present spectrum usage in an optical network. The memory 210 can include instructions that, when executed, cause the processor 202 to cause a display of a network map of the optical network comprising a plurality of nodes and a plurality of links connecting the plurality of nodes to one another, responsive to obtaining spectrum data comprising channel assignments on the plurality of links and nodes as endpoints of the associated channel assignments, cause a display of a plurality of circular histograms to visually illustrate spectrum usage in the optical network, and adjust the plurality of circular histograms based on selections of a plurality of endpoints in the optical network. The plurality of circular histograms visually represent the spectrum usage by representing the optical spectrum in the optical network in a clockwise direction, and wherein each portion or segment of the plurality of circular histograms represents one of a wavelength and a portion of spectrum.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method for visually presenting spectrum usage of optical spectrum in an optical network, the computer-implemented method comprising:
    displaying a network map of the optical network comprising a plurality of nodes and a plurality of links connecting the plurality of nodes to one another;
    responsive to obtaining spectrum data comprising channel assignments on the plurality of links and nodes as endpoints of the associated channel assignments, displaying a plurality of circular histograms to visually illustrate spectrum usage in the optical network; and
    adjusting the plurality of circular histograms based on selections of a plurality of endpoints in the optical network.

2. The computer-implemented method of claim 1, wherein the plurality of circular histograms visually represent the spectrum usage by representing the optical spectrum in the optical network around the associated circular histogram, and wherein each portion or segment of the plurality of circular histograms represents one of a wavelength and a portion of spectrum.

3. The computer-implemented method of claim 1, wherein the plurality of circular histograms are concentric to one another.

4. The computer-implemented method of claim 1, wherein the plurality of circular histograms comprise a first circular graph, a second circular graph, and a third circular graph concentric to one another.

5. The computer-implemented method of claim 1, further comprising:
    receiving selections of nodes and automatically updating the plurality of circular histograms based on the selections.

6. The computer-implemented method of claim 1, further comprising:
    determining and displaying a plurality of network utilization metrics comprising one or more of network used spectrum, link used spectrum, link connection hop efficiency, and link connection termination efficiency.

7. The computer-implemented method of claim 1, further comprising:
    determining and displaying a plurality of blocking probabilities comprising an average frequency of lit channels across the optical spectrum for network links networkwide, sub-region and for paths.

8. The computer-implemented method of claim 1, further comprising:
    performing and displaying an optimization to compare the optical network at present versus an optimized configuration.

9. The computer-implemented method of claim 1, further comprising:
    prior to the displaying steps, receiving network data from one or more of a Network Management System (NMS), Element Management System (EMS), a planning tool, a control plane, a Software Defined Networking (SDN) controller, and an SDN application.

10. The computer-implemented method of claim 1, wherein the spectrum usage in the optical network illustrates a combination of 50 GHz fixed grid spacing and 100G fixed grid spacing.

11. The computer-implemented method of claim 2, wherein the optical spectrum is defined via one of a fixed grid, a flexible grid, and a combination of the fixed grid and the flexible grid.

12. The computer-implemented method of claim 4, wherein the first circular graph represents the spectrum usage networkwide and each segment in the first circular graph illustrating how much the segment is used networkwide,
    wherein the second graph represents the spectrum usage on a sub-region of the optical network and each segment in the second circular graph illustrating how much the segment is used in the sub-region, and
    wherein the third graph represents the spectrum usage on paths of the optical network and each segment in the third circular graph illustrating whether the segment is used in the paths.

13. The computer-implemented method of claim 4, wherein the plurality of circular histograms further comprise a sub-rate circular graph inside the plurality of circular histograms.

14. The computer-implemented method of claim 5, wherein the selections are one of made via selected nodes in the network map, via a lasso of an area in the network map, and via inputs stating A-Z nodes.

15. A server configured to visually present spectrum usage of optical spectrum in an optical network, the server comprising:
    a network interface and a processor connected to one another; and
    memory storing instructions that, when executed, cause the processor to
        cause a display of a network map of the optical network comprising a plurality of nodes and a plurality of links connecting the plurality of nodes to one another,
        responsive to obtaining spectrum data comprising channel assignments on the plurality of links and nodes as endpoints of the associated channel assignments, cause a display of a plurality of circular histograms to visually illustrate spectrum usage in the optical network, and adjust the plurality of circular histograms based on selections of a plurality of endpoints in the optical network.

16. The server of claim 15, wherein the plurality of circular histograms visually represent the spectrum usage by representing the optical spectrum in the optical network around the associated circular histogram, and wherein each portion or segment of the plurality of circular histograms represents one of a wavelength and a portion of spectrum.

17. The server of claim 15, wherein the plurality of circular histograms comprise a first circular graph, a second circular graph, and a third circular graph concentric to one another.

18. The server of claim 17, wherein the first circular graph represents the spectrum usage networkwide and each segment in the first circular graph illustrating how much the segment is used networkwide, wherein the second graph represents the spectrum usage on a sub-region of the optical network and each segment in the second circular graph illustrating how much the segment is used in the sub-region, and wherein the third graph represents the spectrum usage on paths of the optical network and each segment in the third circular graph illustrating whether the segment is used in the paths.

19. The server of claim 17, wherein the plurality of circular histograms further comprise a sub-rate circular graph inside the plurality of circular histograms.

20. A non-transitory computer readable medium comprising instructions executable by a processor to visually present spectrum usage of optical spectrum in an optical network, and in response to such execution causes the processor to perform operations comprising:

displaying a network map of the optical network comprising a plurality of nodes and a plurality of links connecting the plurality of nodes to one another;

responsive to obtaining spectrum data comprising channel assignments on the plurality of links and nodes as endpoints of the associated channel assignments, displaying a plurality of circular histograms to visually illustrate spectrum usage in the optical network; and adjusting the plurality of circular histograms based on selections of a plurality of endpoints in the optical network.

* * * * *